(12) United States Patent
Rosenstein et al.

(10) Patent No.: US 11,660,759 B2
(45) Date of Patent: *May 30, 2023

(54) USER-ASSISTED ROBOTIC CONTROL SYSTEMS

(71) Applicant: Soft Robotics, Inc., Bedford, MA (US)

(72) Inventors: Michael Rosenstein, Westford, MA (US); Jeff Curhan, Warwick, RI (US); Joshua Aaron Lessing, Cambridge, MA (US); Ryan Knopf, Cambridge, MA (US); Daniel Harburg, Cambridge, MA (US); Mark Chiappetta, Westford, MA (US)

(73) Assignee: Soft Robotics, Inc., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/495,125

(22) Filed: Oct. 6, 2021

(65) Prior Publication Data
US 2022/0032475 A1    Feb. 3, 2022

Related U.S. Application Data

(63) Continuation of application No. 15/941,670, filed on Mar. 30, 2018, now Pat. No. 11,173,615.
(Continued)

(51) Int. Cl.
*B25J 15/12*    (2006.01)
*B25J 15/00*    (2006.01)
(Continued)

(52) U.S. Cl.
CPC ......... *B25J 15/0023* (2013.01); *B25J 9/0009* (2013.01); *B25J 9/142* (2013.01);
(Continued)

(58) Field of Classification Search
CPC ...... F15B 15/10; B25J 9/1692; B25J 15/0023; B25J 9/1656; B25J 15/12; B25J 9/142;
(Continued)

(56) References Cited

U.S. PATENT DOCUMENTS 9,715,232 B1 *   7/2017   Fischer ................. B66F 9/0755
9,751,212 B1 *   9/2017   Martinson ............. G06N 3/008
(Continued)

FOREIGN PATENT DOCUMENTS

| JP | H08132372 A | 5/1996 |
| JP | 2010260173 A | 11/2010 |
| WO | 2011151915 A1 | 7/2013 |

OTHER PUBLICATIONS

Soylu et al., Automation of CRD100 seafloor drill, 2016, IEEE, p. 1-8 (Year: 2016).*
(Continued)

*Primary Examiner* — Mcdieunel Marc
(74) *Attorney, Agent, or Firm* — Goodwin Procter LLP

(57) ABSTRACT

Exemplary embodiments relate to user-assisted robotic control systems, user interfaces for remote control of robotic systems, vision systems in robotic control systems, and modular grippers for use by robotic systems. The systems, methods, apparatuses and computer-readable media instructions described interact with and control robotic systems, in particular pick and place systems using soft robotic actuators to grasp, move and release target objects.

20 Claims, 32 Drawing Sheets

Related U.S. Application Data

(60) Provisional application No. 62/478,775, filed on Mar. 30, 2017.

(51) Int. Cl.

| | | |
|---|---|---|
| *B25J 9/16* | (2006.01) | |
| *B25J 9/00* | (2006.01) | |
| *B25J 9/14* | (2006.01) | |
| *G06F 3/0488* | (2022.01) | |
| *F15B 15/10* | (2006.01) | |

(52) U.S. Cl.
CPC .......... *B25J 9/1612* (2013.01); *B25J 9/1656* (2013.01); *B25J 9/1676* (2013.01); *B25J 9/1689* (2013.01); *B25J 9/1692* (2013.01); *B25J 9/1694* (2013.01); *B25J 9/1697* (2013.01); *B25J 15/12* (2013.01); *F15B 15/10* (2013.01); *G06F 3/0488* (2013.01); *G05B 2219/39466* (2013.01); *G05B 2219/39554* (2013.01); *G05B 2219/40253* (2013.01); *Y10S 901/09* (2013.01); *Y10S 901/29* (2013.01); *Y10S 901/37* (2013.01); *Y10S 901/47* (2013.01)

(58) Field of Classification Search
CPC ...... B25J 9/1676; B25J 9/1694; B25J 9/1689; B25J 9/1612; B25J 9/1697; B25J 9/0009; G06F 3/0488; G05B 2219/39466; G05B 2219/40253; G05B 2219/39554; Y10S 901/29; Y10S 901/47; Y10S 901/37; Y10S 901/09
See application file for complete search history.

(56) References Cited

U.S. PATENT DOCUMENTS

| | | | | |
|---|---|---|---|---|
| 9,827,678 | B1* | 11/2017 | Gilbertson | .......... A47L 11/4055 |
| 10,625,856 | B2* | 4/2020 | Priest | .................... B64C 39/024 |
| 11,179,856 | B2* | 11/2021 | Rosenstein | ............ B25J 9/1612 |
| 11,354,039 | B2* | 6/2022 | George | ................ G06F 3/0608 |
| 11,378,583 | B2* | 7/2022 | Stein | .................... G01N 35/026 |
| 11,525,270 | B2* | 12/2022 | Telleria | .................. B25J 9/1661 |
| 2014/0027774 | A1 | 1/2014 | Li et al. | |

OTHER PUBLICATIONS

Kofman et al., Teleoperation of a robot manipulator using a vision-based human-robot interface, 2016, IEEE, p. 1206-1219 (Year: 2016).*

Askew et al., Ground control testbed for Space Station Freedom robot manipulators, 1993, IEEE, p. 69-75 (Year: 1993).*

Christoforou et al., Robotic Arm for Magnetic Resonance Imaging Guided Interventions, 2006, IEEE, p. 1-6 (Year: 2006).*

* cited by examiner

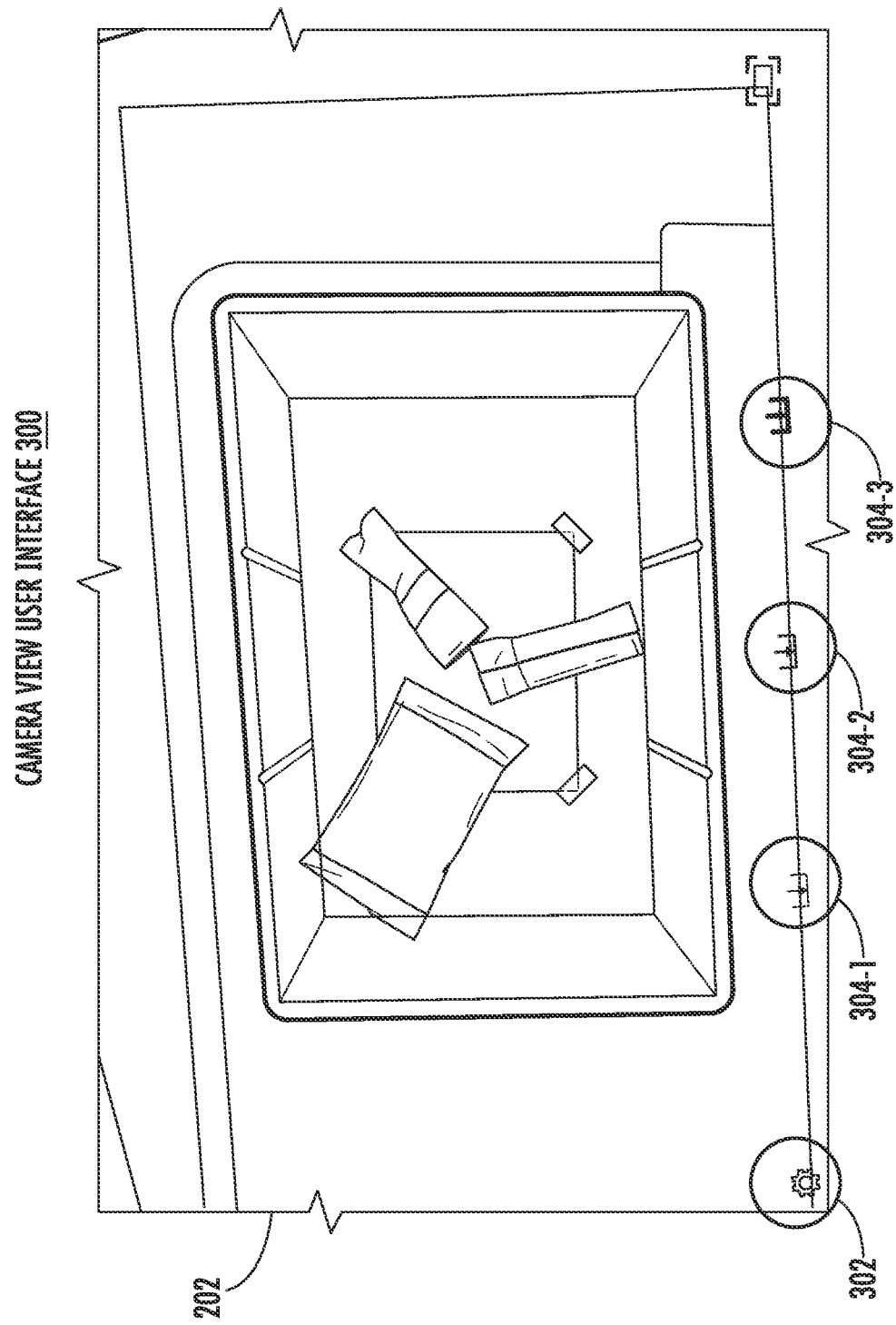

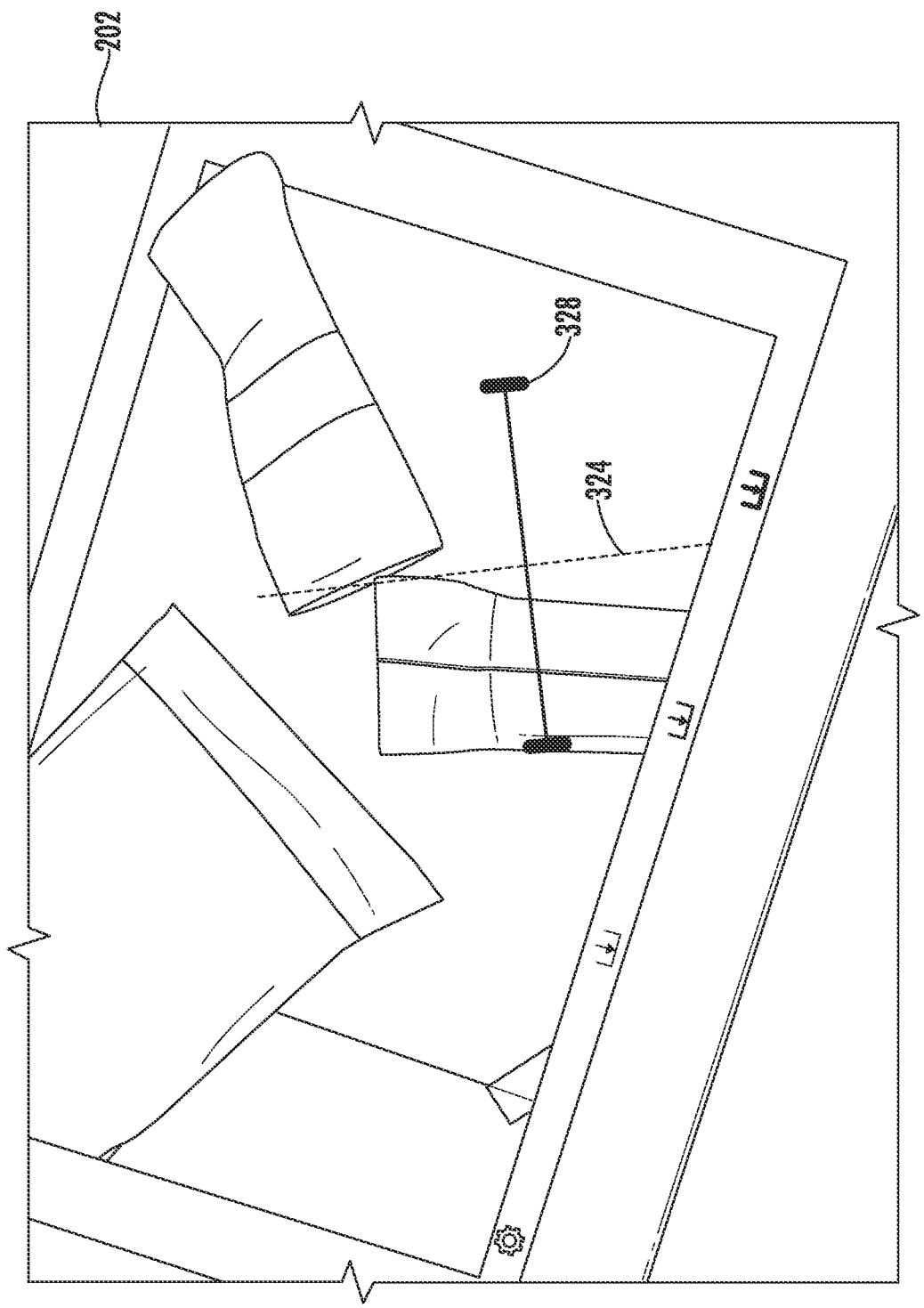

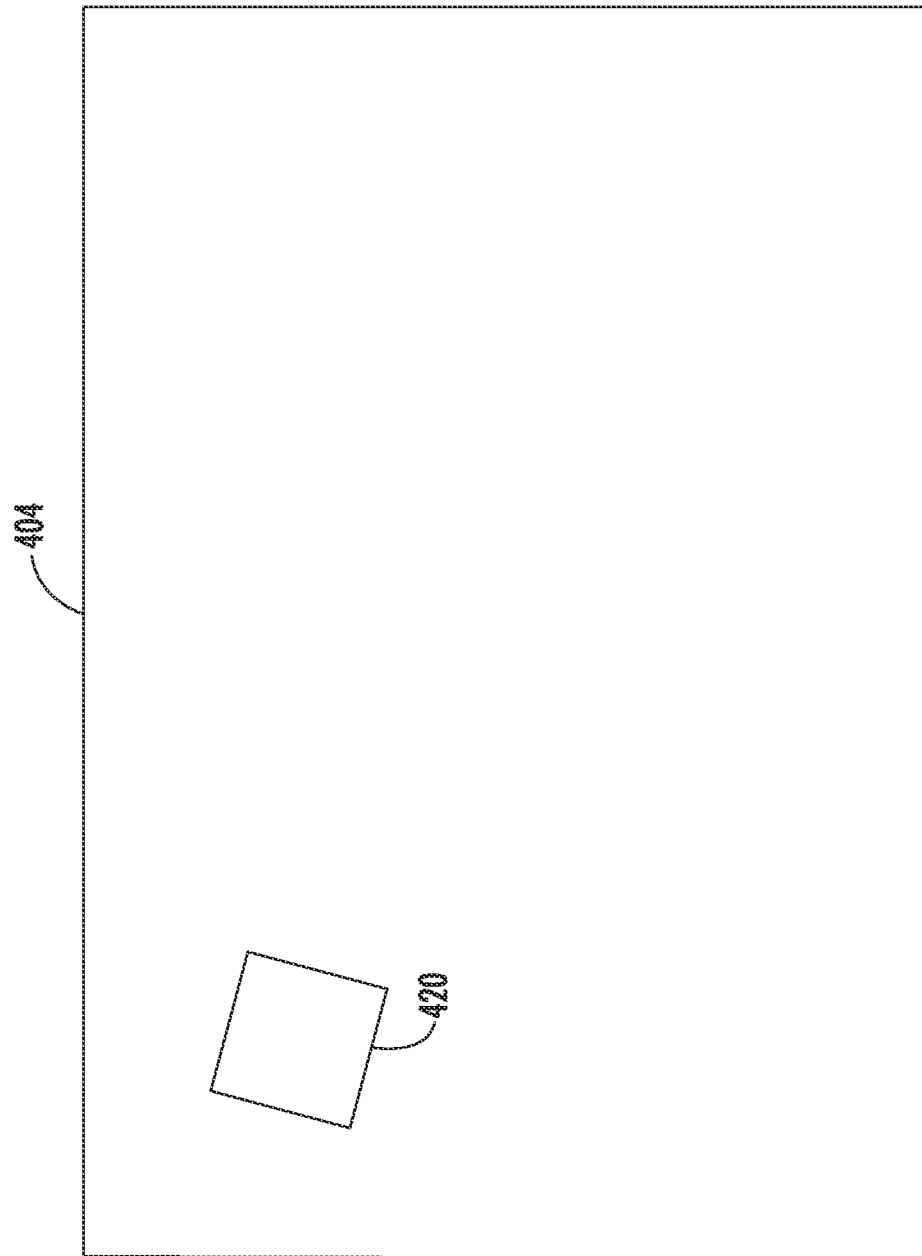

USER-ASSISTED ROBOTIC CONTROL SYSTEMS

RELATED APPLICATIONS

This application is a continuation of, claims the benefit of and priority to previously filed U.S. patent application Ser. No. 15/941,670 filed Mar. 30, 2018, entitled "User-Assisted Robotic Control Systems", which claims priority to U.S. Provisional Application Ser. No. 62/478,775, filed on Mar. 30, 2017, entitled "User-Assisted Robotic Control Systems." The aforementioned applications are incorporated herein by reference in their entireties.

FIELD OF THE DISCLOSURE

The disclosure relates generally to the field of robotics and particularly to novel systems for controlling a robotic system. Exemplary embodiments may be employed in a variety of applications, including (but not limited to) warehouse management, order fulfillment, packaging, recycling, etc.

BRIEF DESCRIPTION OF THE DRAWINGS

FIGS. 3A-H depict a user interface according to exemplary embodiments;

FIGS. 4A-D depict calibration of an exemplary system according to exemplary embodiments;

DETAILED DESCRIPTION OF THE PREFERRED EMBODIMENTS

Figure 1A:
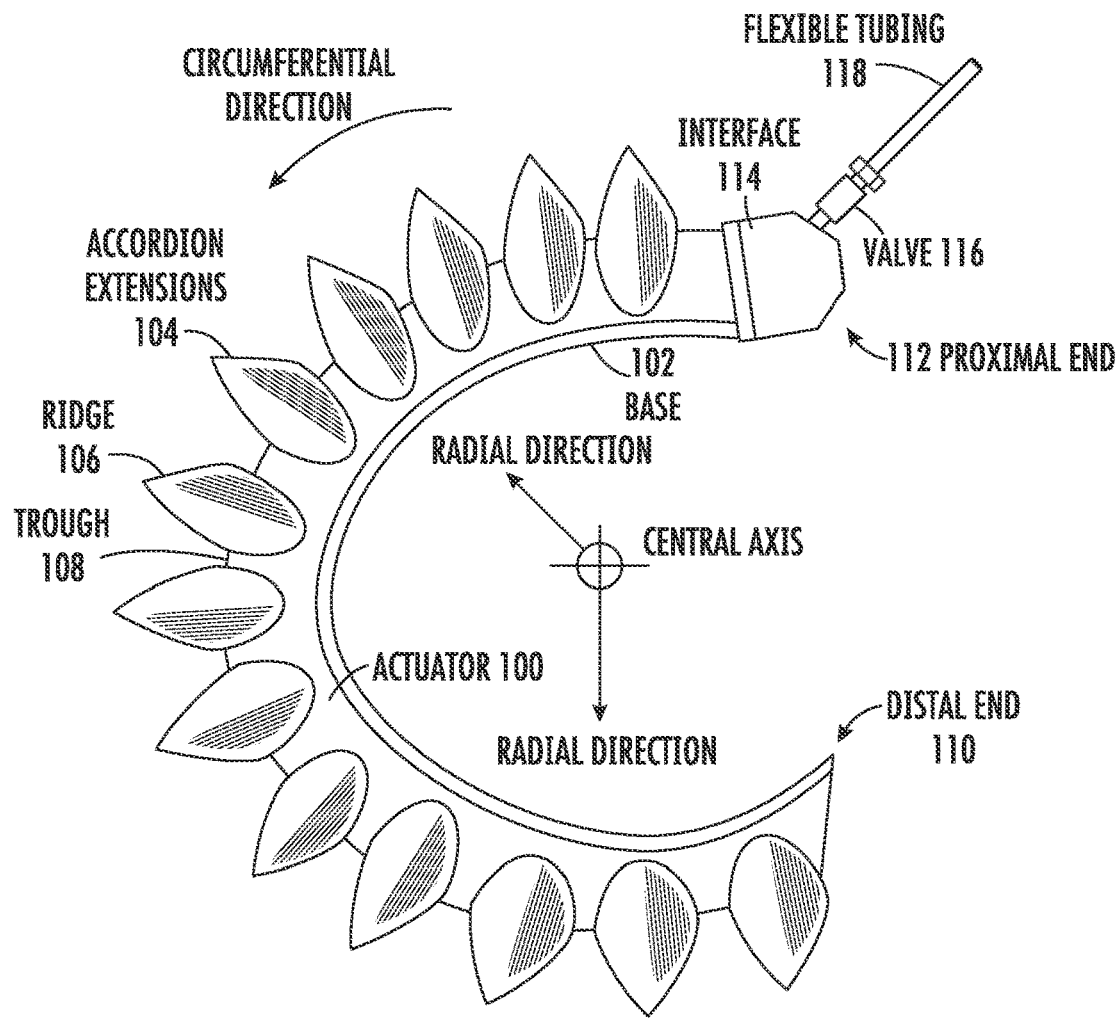
FIGS. 1A-D depict exemplary soft robotic actuators that may be used according to exemplary embodiments.

The present invention will now be described more with reference to the accompanying drawings, in which preferred embodiments of the invention are shown. The invention, however, may be embodied in many different forms and should not be construed as being limited to the embodiments set forth herein. Rather, these embodiments are provided so that this disclosure will be thorough and complete, and will fully convey the scope of the invention to those skilled in the art. In the drawings, like numbers refer to like elements throughout.

I. Introduction to Soft Robotic Grippers

Embodiments described herein may be used in connection with hard robotic grippers (e.g., grippers made of a relatively hard or relatively non-deformable material, such as metal, hard plastic, etc.). In many cases, however, soft robotic grippers may provide improvements over hard robotic grippers. The description below provides background information on soft robotics.

Conventional robotic grippers or actuators may be expensive and incapable of operating in certain environments where the uncertainty and variety in the weight, size and shape of the object being handled has prevented automated solutions from working in the past. The present application describes applications of novel soft robotic actuators that are adaptive, inexpensive, lightweight, customizable, and simple to use.

Soft robotic actuators may be formed of elastomeric materials, such as rubber, or thin walls of plastic arranged in an accordion structure that is configured to unfold, stretch, twist, and/or bend under pressure, or other suitable relatively soft materials. They may be created, for example, by molding one or more pieces of the elastomeric material into a desired shape. Soft robotic actuators may include a hollow interior that can be filled with an inflation fluid, such as air, water, or saline to pressurize, inflate, and/or actuate the actuator. Upon actuation, the shape or profile of the actuator changes. In the case of an accordion-style actuator (described in more detail below), actuation may cause the actuator to curve or straighten into a predetermined target shape. One or more intermediate target shapes between a fully unactuated shape and a fully actuated shape may be achieved by partially inflating the actuator. Alternatively, or in addition, the actuator may be actuated using a vacuum to remove inflation fluid from the actuator and thereby change the degree to which the actuator bends, twists, and/or extends.

Actuation may also allow the actuator to exert a force on an object, such as an object being grasped or pushed. However, unlike traditional hard robotic actuators, soft actuators maintain adaptive properties when actuated such that the soft actuator can partially or fully conform to the shape of the object being grasped. They can also deflect upon collision with an object, which may be particularly relevant when picking an object off of a pile or out of a bin, since the actuator is likely to collide with neighboring objects in the pile that are not the grasp target, or the sides of the bin. Furthermore, the amount of force applied can be spread out over a larger surface area in a controlled manner because the material can easily deform. In this way, soft robotic actuators can grip objects without damaging them.

Moreover, soft robotic actuators allow for types of motions or combinations of motions (including bending, twisting, extending, and contracting) that can be difficult to achieve with traditional hard robotic actuators.

Figure 1B:
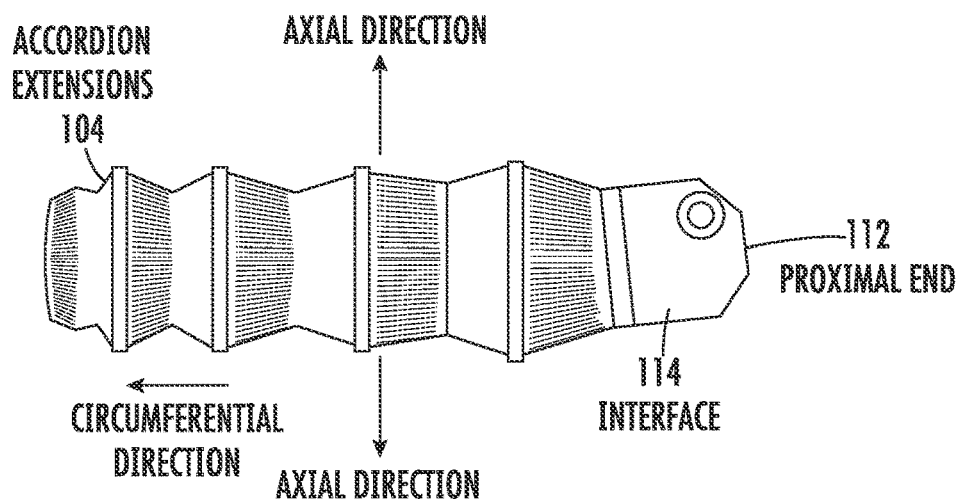
Figure 1C:
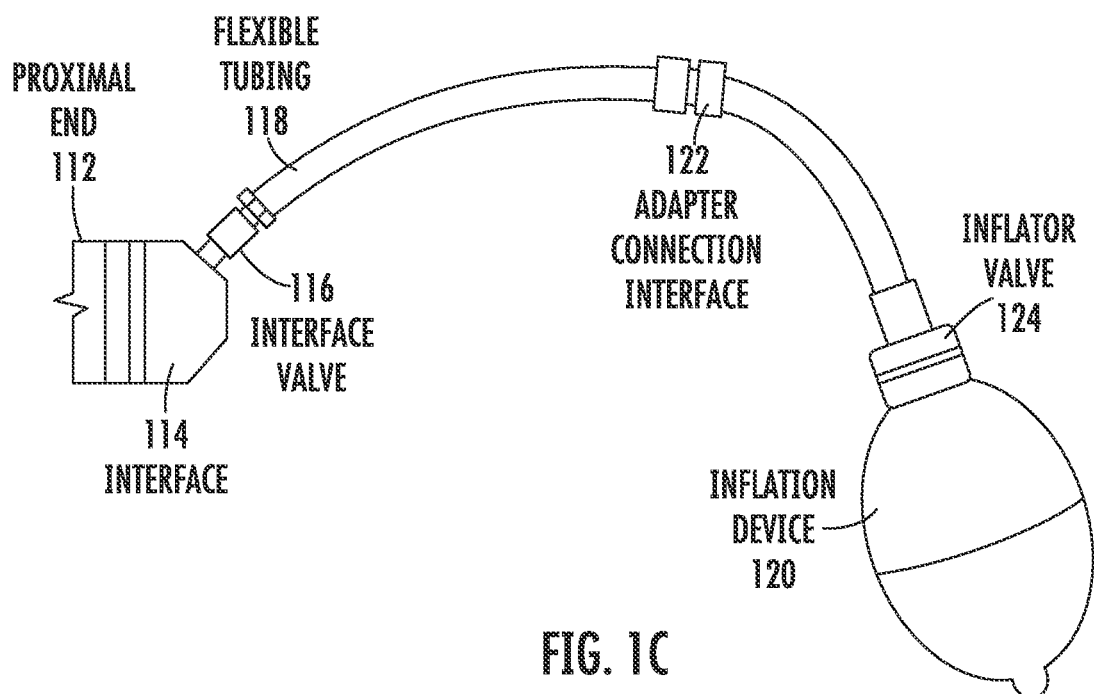
Figure 1D:
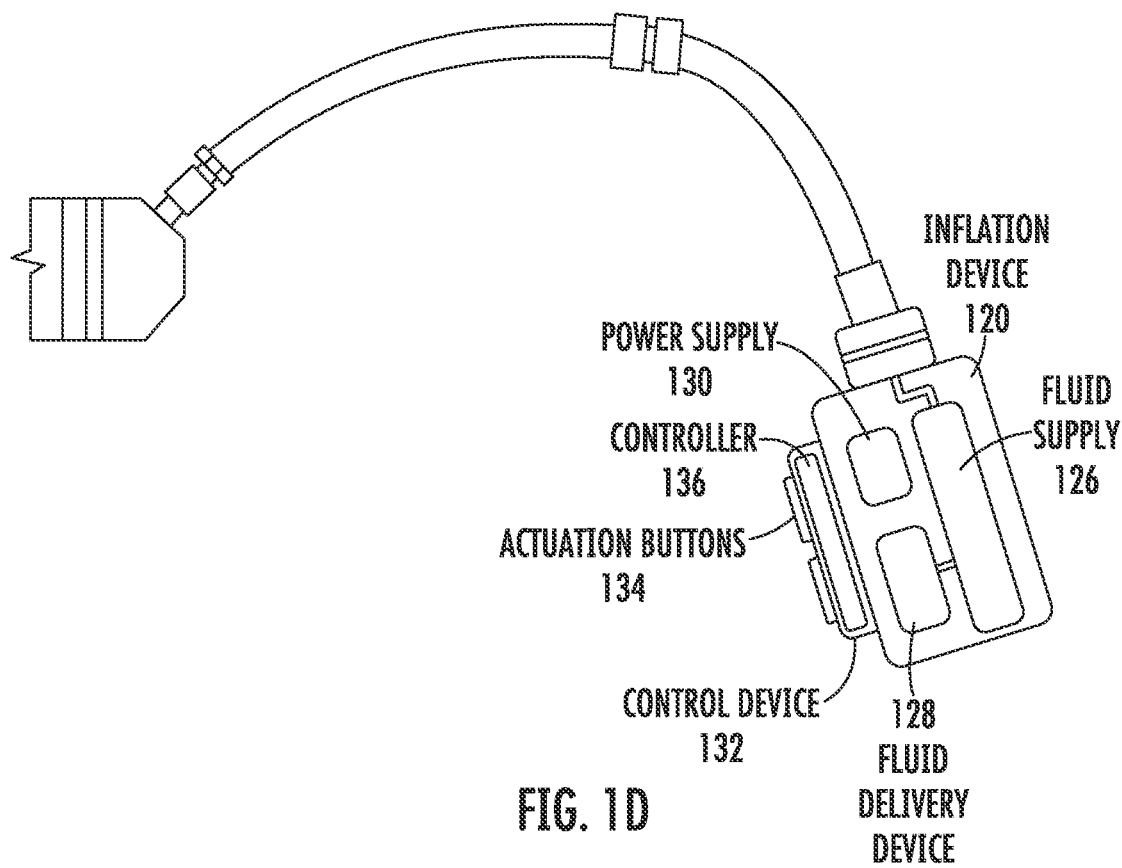

FIGS. 1A-1D depict exemplary soft robotic actuators. More specifically, FIG. 1A depicts a side view of a portion of a soft robotic actuator. FIG. 1B depicts the portion from FIG. 1A from the top. FIG. 1C depicts a side view of a portion of the soft robotic actuator including a pump that may be manipulated by a user. FIG. 1D depicts an alternative embodiment for the portion depicted in FIG. 1C.

An actuator may be a soft robotic actuator 100, as depicted in FIG. 1A, which is inflatable with an inflation fluid such as air, water, or saline. The inflation fluid may be provided via an inflation device 120 through a fluidic connection 118.

The actuator 100 may be in an uninflated state in which a limited amount of inflation fluid is present in the actuator 100 at substantially the same pressure as the ambient environment. The actuator 100 may also be in a fully inflated state in which a predetermined amount of inflation fluid is present in the actuator 100 (the predetermined amount corresponding to a predetermined maximum force to be applied by the actuator 100 or a predetermined maximum pressure applied by the inflation fluid on the actuator 100). The actuator 100 may also be in a full vacuum state, in which all fluid is removed from the actuator 100, or a partial vacuum state, in which some fluid is present in the actuator 100 but at a pressure that is less than the ambient pressure. Furthermore, the actuator 100 may be in a partially inflated state in which the actuator 100 contains less than the predetermined amount of inflation fluid that is present in the fully inflated state, but more than no (or very limited) inflation fluid.

In the inflated state, the actuator 100 may exhibit a tendency to curve around a central axis as shown in FIG. 1A. For ease of discussion, several directions are defined herein. An axial direction passes through the central axis around which the actuator 100 curves, as shown in FIG. 1B. A radial direction extends in a direction perpendicular to the axial direction, in the direction of the radius of the partial circle formed by the inflated actuator 100. A circumferential direction extends along a circumference of the inflated actuator 100.

In the inflated state, the actuator 100 may exert a force in the radial direction along the inner circumferential edge of the actuator 100. For example, the inner side of the distal tip of the actuator 100 exerts a force inward, toward the central axis, which may be leveraged to allow the actuator 100 to grasp an object (potentially in conjunction with one or more additional actuators 100). The soft robotic actuator 100 may remain relatively conformal when inflated, due to the materials used and the general construction of the actuator 100.

The actuator 100 may be made of one or more elastomeric materials that allow for a relatively soft or conformal construction. Depending on the application, the elastomeric materials may be selected from a group of food-safe, biocompatible, or medically safe, FDA-approved materials. The actuator 100 may be manufactured in a Good Manufacturing Process ("GMP")-capable facility.

The actuator 100 may include a base 102 that is substantially flat (although various amendments or appendages may be added to the base 102 in order to improve the actuator's gripping and/or bending capabilities). The base 102 may form a gripping surface that grasps a target object.

The actuator 100 may include one or more accordion extensions 104. The accordion extensions 104 allow the actuator 100 to bend or flex when inflated, and help to define the shape of the actuator 100 when in an inflated state. The accordion extensions 104 include a series of ridges 106 and troughs 108. The size of the accordion extensions 104 and the placement of the ridges 106 and troughs 108 can be varied to obtain different shapes or extension profiles.

Although the exemplary actuator of FIGS. 1A-1D is depicted in a "C" or oval shape when deployed, one of ordinary skill in the art will recognize that the present invention is not so limited. By changing the shape of the body of the actuator 100, or the size, position, or configuration of the accordion extensions 104, different sizes, shapes, and configurations may be achieved. Moreover, varying the amount of inflation fluid provided to the actuator 100 allows the retractor to take on one or more intermediate sizes or shapes between the un-inflated state and the inflated state. Thus, an individual actuator 100 can be scalable in size and shape by varying inflation amount, and an actuator can be further scalable in size and shape by replacing one actuator 100 with another actuator 100 having a different size, shape, or configuration.

The actuator 100 extends from a proximal end 112 to a distal end 110. The proximal end 112 connects to an interface 114. The interface 114 allows the actuator 100 to be releasably coupled to a hub or other robotic components. The interface 114 may be made of a medically safe material, such as polyethylene, polypropylene, polycarbonate, polyetheretherketone, acrylonitrile-butadiene-styrene ("ABS"), or acetal homopolymer. The interface 114 may be releasably coupled to one or both of the actuator 100 and the flexible tubing 118. The interface 114 may have a port for connecting to the actuator 100. Different interfaces 114 may have different sizes, numbers, or configurations of actuator ports, in order to accommodate larger or smaller actuators, different numbers of actuators, or actuators in different configurations.

The actuator 100 may be inflated with an inflation fluid supplied from an inflation device 120 through a fluidic connection such as flexible tubing 118. The interface 114 may include or may be attached to a valve 116 for allowing fluid to enter the actuator 100 but preventing the fluid from exiting the actuator (unless the valve is opened). The flexible tubing 118 may also or Alternatively, attach to an inflator valve 124 at the inflation device 120 for regulating the supply of inflation fluid at the location of the inflation device 120.

The flexible tubing 118 may also include an actuator connection interface 122 for releasably connecting to the interface 114 at one end and the inflation device 120 at the other end. By separating the two parts of the actuator connection interface 122, different inflation devices 120 may be connected to different interfaces 114 and/or actuators 100.

The inflation fluid may be, for example, air or saline. In the case of air, the inflation device 120 may include a hand-operated bulb or bellows for supplying ambient air. In the case of saline, the inflation device 120 may include a syringe or other appropriate fluid delivery system. Alternatively, or in addition, the inflation device 120 may include a compressor or pump for supplying the inflation fluid.

The inflation device 120 may include a fluid supply 126 for supplying an inflation fluid. For example, the fluid supply 126 may be a reservoir for storing compressed air, liquefied or compressed carbon dioxide, liquefied or compressed nitrogen or saline, or may be a vent for supplying ambient air to the flexible tubing 118.

The inflation device 120 further includes a fluid delivery device 128, such as a pump or compressor, for supplying inflation fluid from the fluid supply 126 to the actuator 100 through the flexible tubing 118. The fluid delivery device 128 may be capable of supplying fluid to the actuator 100 or withdrawing the fluid from the actuator 100. The fluid delivery device 128 may be powered by electricity. To supply the electricity, the inflation device 120 may include a power supply 130, such as a battery or an interface to an electrical outlet.

The power supply 130 may also supply power to a control device 132. The control device 132 may allow a user to control the inflation or deflation of the actuator, e.g. through one or more actuation buttons 134 (or alternative devices, such as a switch). The control device 132 may include a controller 136 for sending a control signal to the fluid delivery device 128 to cause the fluid delivery device 128 to supply inflation fluid to, or withdraw inflation fluid from, the actuator 100.

II. User-Assisted Robotic Control Systems

Exemplary embodiments encompass several aspects of robotic control systems. In particular, some embodiments relate to an overall architecture including a "human in the loop" form of supervisory control. Such a system may provide hardware and software to allow a user to interact with one or multiple robotic systems either locally or remotely, and may include, separately or in combination, improvements in robot control and in analysis systems for performing tasks such as data analytics and data mining, and other improvements.

Further embodiments, which may be used separately or in conjunction with other embodiments described herein, relate to user interface design for robotic control systems. The exemplary user interfaces described herein may provide efficient and simple procedures for interacting with one or multiple robotic systems.

Further embodiments, which may be used separately or in conjunction with other embodiments described herein, relate to improved visualization and three-dimensional locating and maneuvering, as well as camera and robot calibration, and other improvements.

Still further, some embodiments (which may be used separately or in conjunction with other embodiments described herein) relate to modular robotic grippers that allow different types or configurations of grippers to be rapidly deployed in connection with a robotic system.

The overall architecture is next described with reference to FIGS. 2A-2G. Unless otherwise noted, individual improvements described herein may be used separately or in combination with any other improvements.

A. Architecture Overview

Figure 2A:
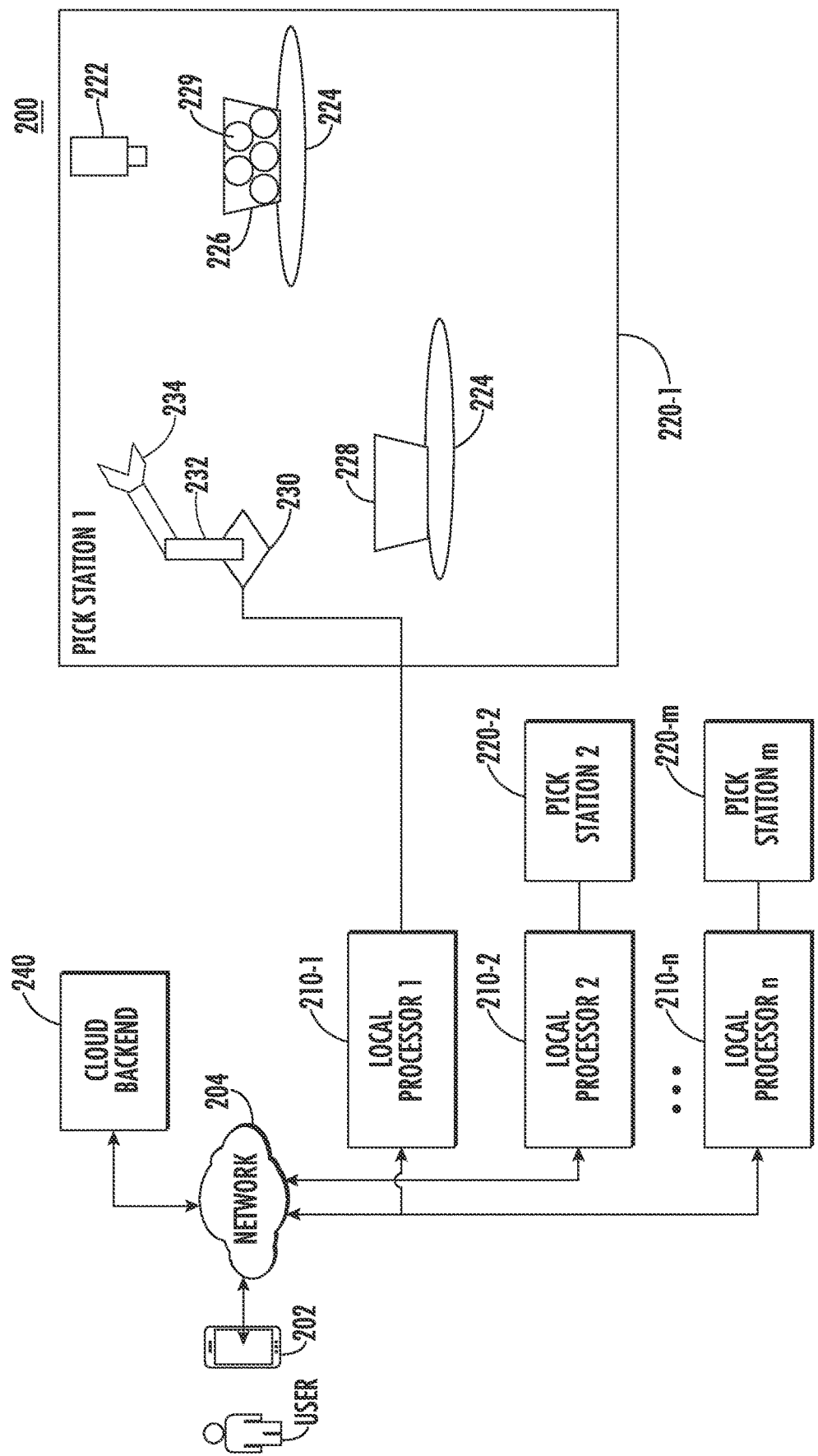
FIGS. 2A-G depict an exemplary robotic system architecture according to exemplary embodiments.

FIG. 2A is a block diagram depicting an overview of a robotic control architecture 200. Although the exemplary architecture of FIG. 2A includes particular elements in particular arrangements or configurations, other elements, arrangements, and combinations may be employed without deviating from the scope of the present invention.

According to exemplary embodiments, a user may interact with an electronic processing device 202 (e.g., a desktop computer, a laptop computer, a mobile phone, a tablet, a special-purpose kiosk, etc.). In some embodiments, the electronic device 202 may be provided with a touch screen or other form of haptic input for allowing the user to interact with an interface via touches and/or gestures. In other embodiments, the electronic device 202 may be provided with some other form of input, such as a keyboard, a mouse, a video camera or instrumented glove for gesture-based control, a microphone and associated logic for performing voice control, etc. Interactions with the electronic device may be in the form of various control directives. A control directive may be any input from a user to the electronic device 202, for example, and without limitation, a touch on a touch sensitive display with a finger or a stylus, the use of an input device to select a user interface element such as an icon or a menu item, an audio command, a motion-captured input, a motion of the electronic device, and so forth.

Figure 2B:
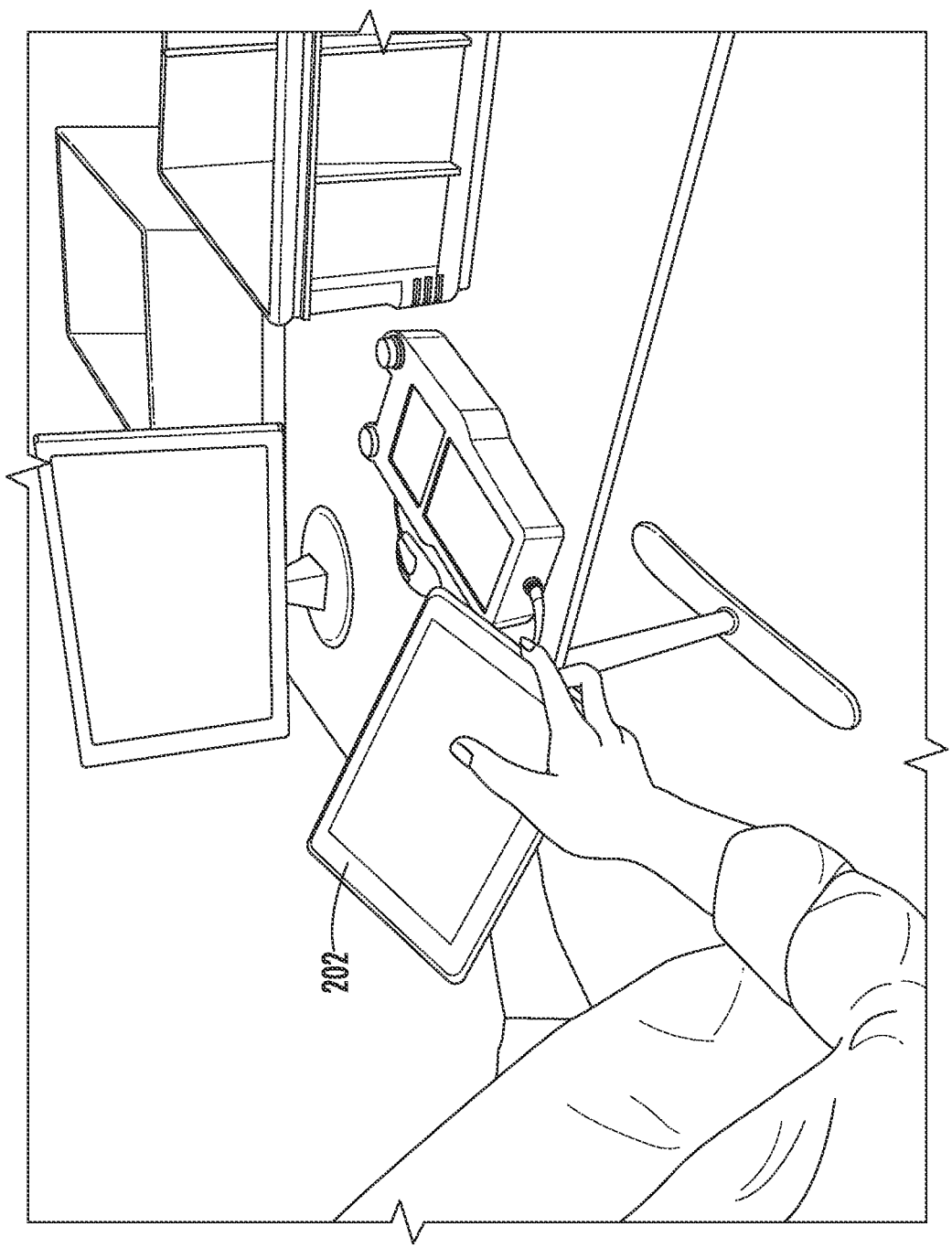

Using the electronic device 202, the user is able to interact with a robotic system or multiple different robotic systems. Preferably, the electronic device 202 allows the user to interact, via control directives, with multiple (e.g., three or more) robotic pick-and-place stations simultaneously. An exemplary electronic device for controlling robotic systems is depicted in FIG. 2B below, and further described in the next section relating to device interfaces.

The electronic device 202 may include a wired or wireless network interface for connecting to a network 204, such as the Internet. Through the network connection, the user may be capable of interacting with robotic systems in a remote location. For example, a user in their home or an office may control robotic systems in a remote warehouse, fulfillment center, or other location anywhere that is accessible to the network 204.

According to some embodiments, a human user may be supplemented by, or may be replaced by, artificially intelligent control logic. Accordingly, the system may be readily upgradeable as technology advances. For example, initially a user may fully control the grasp actions of the robotic system, including designating where the robotic gripper should deploy in order to grasp a target item.

As visualization and object recognition technology improves, the system may recognize and/or differentiate between different target objects, allowing the user to simply tap or click on a target object to select it. The gripper may then automatically deploy in order to grasp the target. In such a scenario, a human user may still make decisions as to which targets to grasp, in which order, and where to release the target objects. As artificially intelligent controls improve further, machine logic may fully replace a human user in making these decisions.

The network 204 may be the Internet, a public network, a private network, or any combination thereof. Examples of network architectures are described in more detail in connection with FIG. 8.

Using the network, the electronic device 202 may interact with one or more local (e.g., local to the robotic system) processors 210-1, 210-2 . . . 210-$n$, where n is a positive integer. The local processors 210 may be in the form of any suitable computing device, such as a desktop computer, a server, a mini- or micro-computer, a laptop, a tablet, a mobile device, special-purpose hardware, etc. In some embodiments, each pick-and-place station 220 may be associated with one or more local processors 210 that are unique to the pick-and-place station (e.g., not shared among pick-and-place stations). In other embodiments, one or more local 210 processors may be associated with multiple pick-and-place stations, e.g. local processor 210-2 may be associated with pick and place stations 220-2 and 220-$m$.

The local processors 210 may receive incoming commands from the user's electronic device 202 and may relay appropriate control instructions or commands to the robotic system. Moreover, the local processors 210 may receive information from the robotic system (including from any sensors deployed in connection with the robotic system), and other components of the pick-and-place station such as the camera, the conveyor belts, the bins, etc. Information from the pick-and-place station 220 may be transmitted to the user's electronic device 202 to facilitate control of the robotic system.

Furthermore, information from the local processor, the robotic systems, and/or the user device may be transmitted to a remote processor, depicted as a cloud backend 240 in FIG. 2A. The cloud backend 240 may be any suitable electronic device, such as a desktop computer, a server, a mini- or micro-computer, a laptop, a tablet, a mobile device, special-purpose hardware, etc. The cloud backend 240 may collect data regarding deployed systems, and may use the data for a number of purposes.

For example, the cloud backend 240 may collect snapshots from a camera 222 deployed in the pick-and-place station 220-1 (e.g., at predetermined intervals, or when predetermined events such as possible failure conditions, occur). The cloud backend 240 may further receive information from sensors deployed in conjunction with the pick station 220-1 and/or robotic sensors, such as from object range and depth sensors, grip quality detection and sensors, information about pneumatic/hydraulic flow rates and pressures, and so forth. The cloud backend 240 may also be provided with further information (automatically or manually), including failure rates of actuators, grippers, and other robotic systems, maintenance schedules and identified problems, software crashes, etc.

The cloud backend 240 may perform data mining and analytics on the collected data. Based on the collected data, the cloud backend 240 may recommend changes to maintenance or replacement schedules, may suggest repairs or optimizations, and/or may automatically make (or may recommend) changes or improvements to the software control systems of the local processors 210 and/or the user's electronic device 202, among other possibilities.

For example, if the cloud backend 240 determines, based on one or more grasp detection sensors and/or range sensors, that the current robotic control software is not descending to an appropriate depth before attempting a grasp by closing a robotic gripper 234, the cloud backend 240 may transmit an update or patch that changes the initial depth at which a robotic arm 232 deploys. Similarly, the cloud backend 240 may transmit changes to the gripper orientation, the motion path, the grasp force, etc.

The update may be applied locally (e.g., to change the behavior of one robot) or globally (e.g., to change the behavior of a group of robots, a fleet of robots, or all robots accessible to the cloud backend 240). For example, if 10 robots in a fleet of 10,000 attempted to grip a new object with varied success, then based on these teachings the entire fleet of 10,000 received an update that allowed all of the robots to successfully grasp the item.

To these ends and others, the cloud backend 240 may further transmit over-the-air updates to the local processors 210 to upgrade or repair the control software for the robotic systems. The cloud backend 240 may also transmit over-the-air updates to the user's electronic device 202 for purposes of software upgrade or repair, among other possibilities.

As noted above, the local processor(s) 210 may be associated with one or more pick-and-place stations 220 assigned to a particular user. For example, a given location, such as a warehouse or fulfillment center, may include many pick-and-place stations, with particular stations or groups of stations assigned to different users. As used herein, a "pick-and-place station"—or simply "pick station"—may represent many different applications where a robot arm and gripper manipulates objects, such as (but not limited to) bin-picking for warehouses, produce packaging, machining, inspections, etc. The following are but a few examples of applications for the technology described herein:

Picking a casting of a metal part, for example a partially finished brass valve, from a pile and placing it in a fixture for machining Picking a melon from a pile and placing it in a peeler chunker machine.

Picking a single piece of plastic of a particular polymer type (e.g. polyethylene, polypropylene, polyethylene terephthalate, etc.) out of a pile of mixed plastics at a recycling center and placing it in a bin of just that plastic type.

Picking a piece of fruit from a tree and placing it in a crate.

Figure 2C:
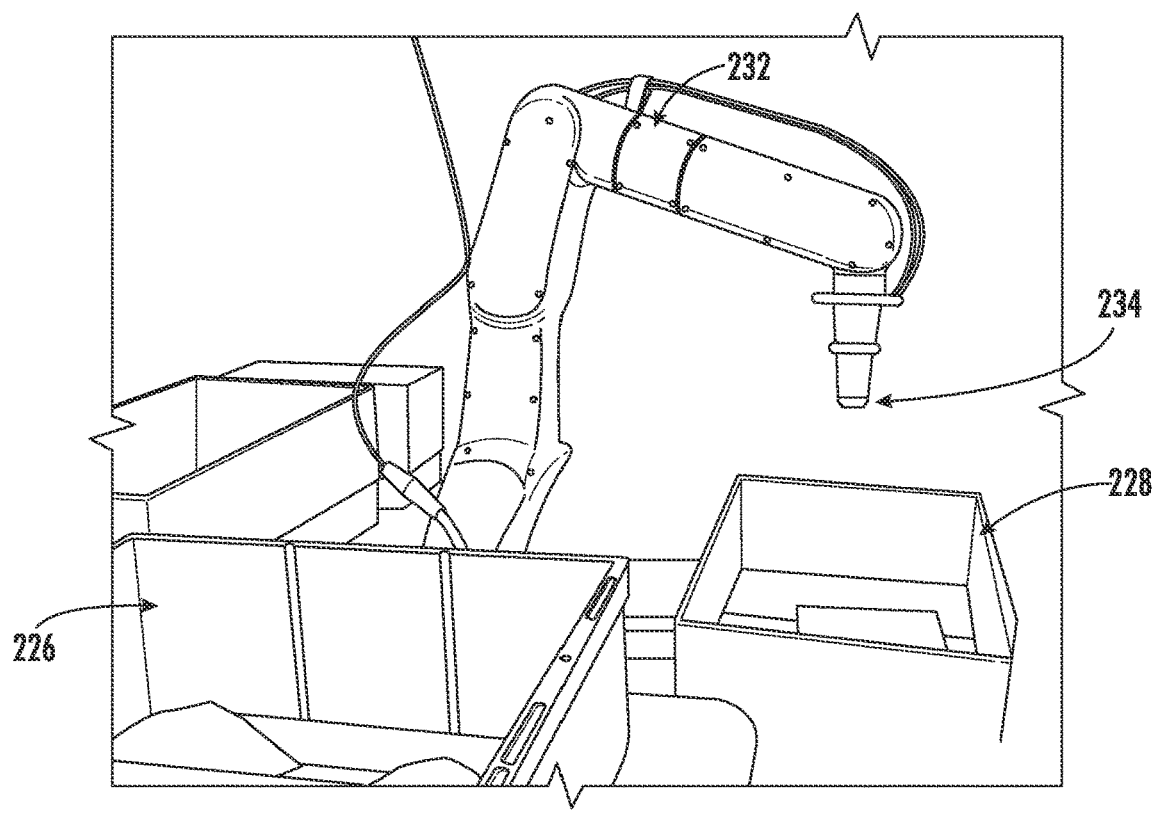
Figure 2D:
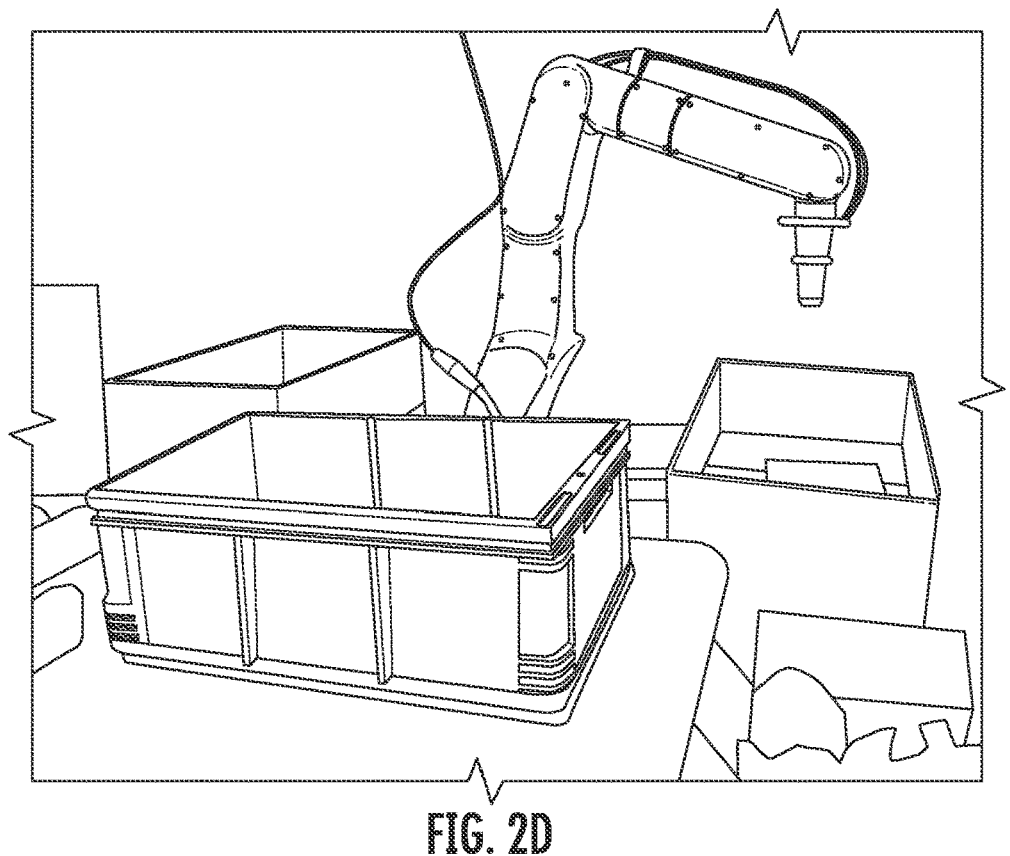

A simplified example of a pick station is depicted in FIGS. 2C and 2D.

According to exemplary embodiments, each pick station, e.g. pick station 220-1, may be associated with a robotic system, a source bin 226 in which target objects 229 are delivered to the pick station 220-1 to be grasped by the robotic system, a target bin 228 into which target objects 229 are delivered by the robotic system, and one or more cameras 222 (e.g., one or more cameras deployed above the source bin and/or the target bin). The source bin 226 and/or target bin 228 may be delivered to the pick station by a person or by means of conveyor belts 224 or other suitable devices.

One of ordinary skill in the art will understand that other configurations for a pick station are possible. For example, the target objects may not initially be deployed in a source bin, but could be delivered directly on the conveyor or in another manner that does not rely on conveyors. In one example, the target objects may be deployed on a mobile shelving system, where an entire shelf is moved to the pick station. Similarly, the target object may be delivered to a receptacle or other recipient location that does not include a target bin. The camera could be mounted to the side or below the container. Many other configurations are also possible within the scope of the present invention.

In addition to a camera, other sensors may be present to detect objects in a bin or to detect objects as they enter or leave a bin. Such sensors may include but are not limited to weight sensors (load cell or force/torque sensor), accelerometers or other vibration sensors, three-dimensional depth cameras, photoelectric break beams, spectrometers, hyperspectral imagers, and laser range scanners.

The robotic system may include a base 230, to which a robotic arm 232 including one or more joints is attached. The base 230 and/or arm 232 may support pneumatic and/or hydraulic connections for actuating a soft robotic gripper 234, and/or electrical and/or data connections for supporting sensors and other devices deployed in connection with the arm 232 or gripper 234.

The gripper 234 may include a hub for connecting the gripper 234 to the robotic arm 232. One or more actuators (e.g., soft robotic actuators) may be attached to the hub to form the gripper. The hub may include connections, such as hydraulic or pneumatic connections, to deliver actuation fluid to the actuator(s), either separately or as a group.

The hub may further include mounting points for sensors and other devices, and may include electrical and/or data connections for powering and communicating with the devices. For example, the hub may include a range sensor deployed in a location (e.g., the bottom of the hub, between the actuators) that allows the system to determine a range to a target object to be grasped. The hub may further include a camera to sense and visualize characteristics of a grasped object prior to, during, and after attempting a grasp of that object. The hub may further include an accelerometer or force detection sensor to determine sway characteristics, momentum, or inertia information relating to a grasped object (thereby allowing the system to adjust the manner in which the object is held or moved to improve holding or transport characteristics). Further embodiments may include one or more grasp or force sensors to determine how well or with how much force a gripper is holding a target object. The grasp or force sensors may be mounted on or deployed in the hub and/or actuators.

In some embodiments, each actuator may be associated with a hub slidably attached to one or more rails that permit the actuators to move relative to each other. The rail may be attached to the robotic arm. The hubs may be manually adjusted along the rail, or may be automatically adjusted via a motor, pneumatics, hydraulics, etc. Accordingly, the spacing between the actuators and/or the configuration of actuators with respect to each other may be adjusted as needed. Exemplary grippers suitable for use with exemplary embodiments are further described in the section on modular grippers, below.

In some embodiments, more than one hub may be connected to each other by rails, so as to support simultaneous grasping of multiple objects. The actuators associated with each hub may be controlled independently or as a single unit. The relative positions of the hubs may be adjusted along the rails, either manually or automatically via motor, pneumatics, hydraulics, etc.

Figure 2E:
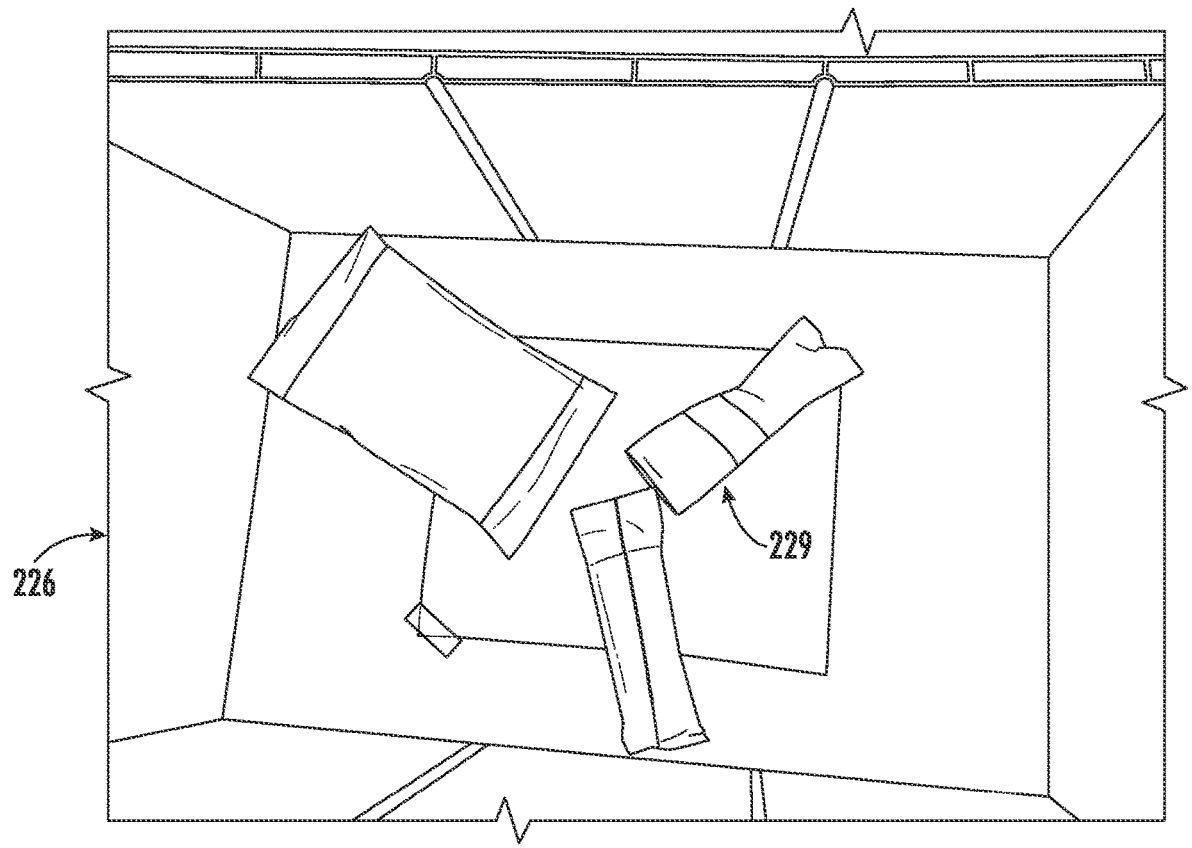

Target objects may be delivered to the pick station in a source bin. The source bin may be any receptacle suitable for conveying items to the pick station. An example of an interior view of a source bin including several target items is depicted in FIG. 2E. It is noted that, although particular examples are described in connection with a "bin," this term may encompass many types of receptacles, such as boxes, cases, etc.

The source bin may be delivered to a location accessible to the robotic system, e.g. by a conveyor system. The robotic system may grasp one or more items in the source bin and deliver the items to a target location, such as a target bin that is also located in a position accessible to the robotic arm. The source bin may be moved away from the robotic system when empty and/or when the relevant items have been removed from the source bin, allowing the source bin to be replaced by a new source bin with new target items. Similarly, when the target bin is full or has received sufficient relevant items, the target bin may be moved away and/or replaced with a new target bin.

Figure 2F:
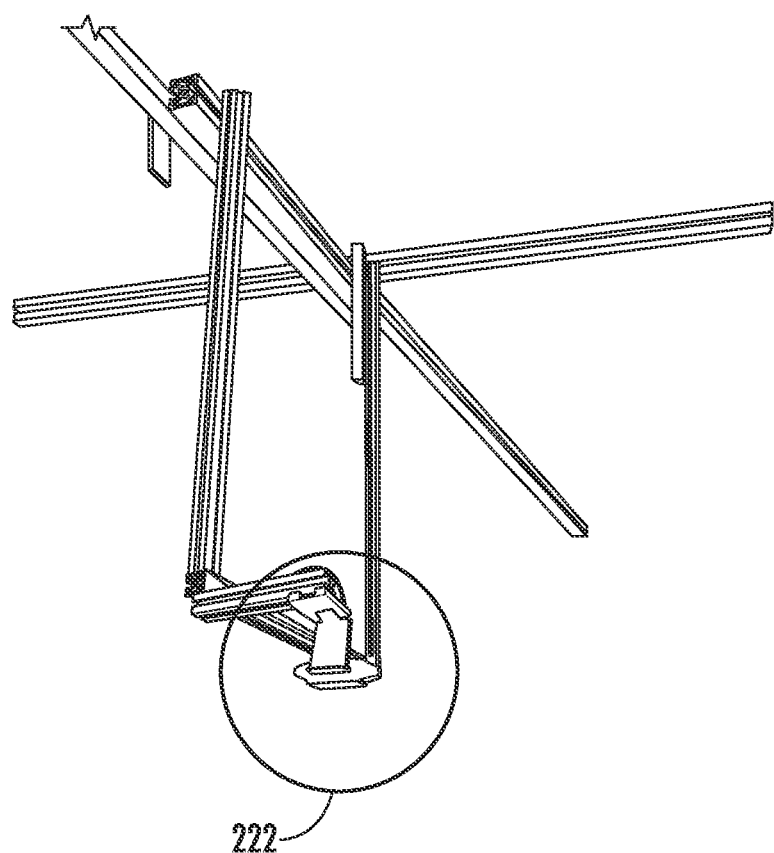
Figure 2G:
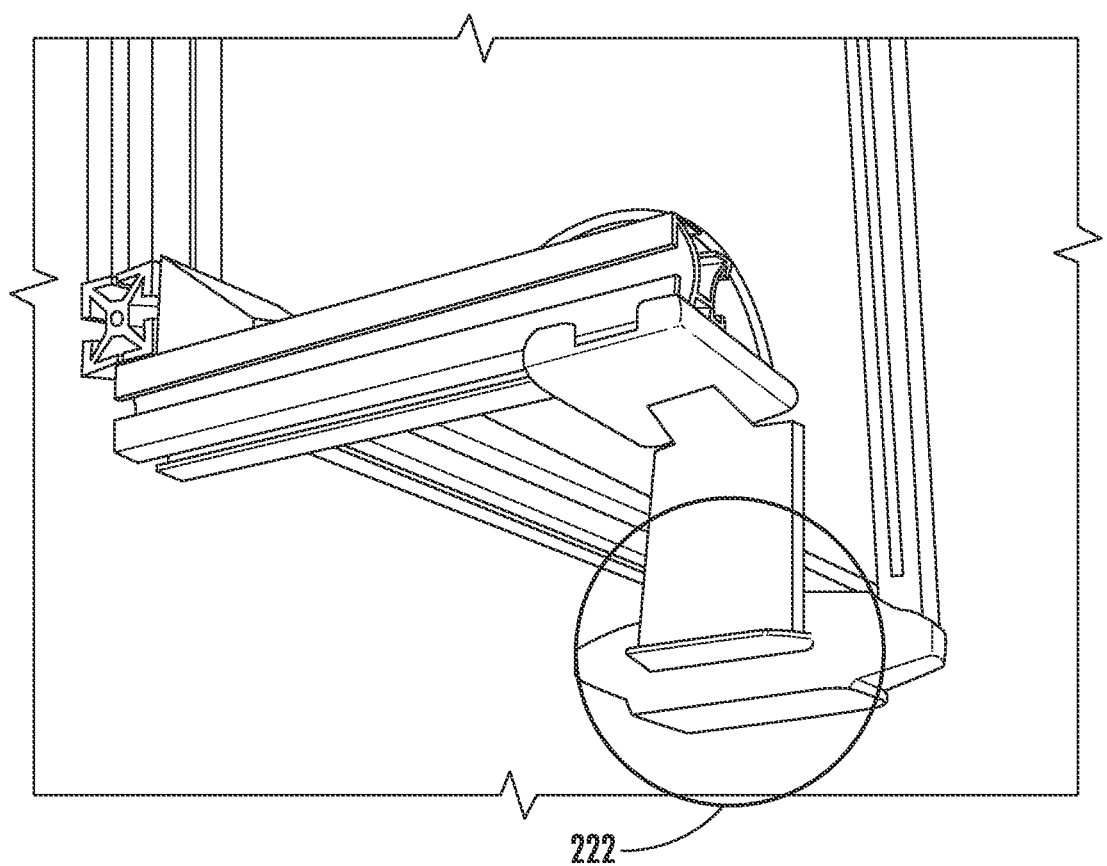

One or more cameras or other visualization sensors may be mounted in a location in which the contents of the source bin and/or target bin may be viewed. For example, camera(s) may be mounted on a gantry above the source bin and/or target bin. Examples of camera systems are depicted in FIGS. 2F-2G.

B. Exemplary Interfaces

The cameras and/or other sensors may be connected (wired or wirelessly) to the local processors 210, which may relay a view of the camera (or other sensor data) to the cloud backend 240 and/or the user's electronic device 202. An interface on the user device 202 may display the camera view, as shown in FIG. 3A.

The interface 300 may include one or more icons or other interactive elements for configuring or controlling the robotic system. Interactive elements may be provided for other operations, for example, and without limitation, a configuration operation, a calibration operation, a grasping operation, a force-setting operation, a flutter operation, a rearranging operation, an actuator sequencing operation, a moving operation, an object selection operation, or a stirring operation. Selecting an interactive element via a control directive may cause a control command corresponding to the interactive element to be transmitted to the robotic system in a selected pick and place station. For some operations, further input may be needed before a control command is transmitted, in which case additional user interface elements and/or interactive elements may be presented to obtain the input.

For example, the depicted example includes a configuration/calibration icon 302 in the bottom left corner that may correspond to a configuration or calibration operation. Interacting with the configuration/calibration icon 302 may cause one or more menu options to be displayed in the interface.

One such menu item may be an option to perform calibration of the pick station, which may include calibrating the camera view in order to provide a canonical view of the source and/or target bin. Such a calibration procedure is described in the visualization section below. In some embodiments, the user may also calibrate the camera view by touching a location (such as the center of an object) on a touch-sensitive display and dragging the haptic contact to re-orient the display.

The main display of the interface may show a view from one or more of the cameras at a particular pick-and-place station. For example, the camera may default to a camera over a source bin. As noted above, multiple pick stations may be accessible and controllable from a given user device. In order to switch between pick stations, the user may, for example, execute a swipe gesture on a touch-sensitive display to move between cameras and/or pick stations. In another example, the user may select an interactive element on the display that may be visible, as an icon or button element, or else hidden, as a region of the display such as one of the four edges of the display. Still further, the interface may display multiple pick station views on a single screen (e.g., in a tiled or cascaded view).

Switching between views of different pick stations may also transfer control from one robotic system to another. For example, if the interface initially displays an image from a first pick station, user commands issued through the electronic device 202 may be issued to the robotic system at the first pick station. If the user then swipes to switch the view to a second pick station, commands issued via the electronic device 202 may be issued to the robotic system at the second pick station.

In some embodiments, the interface may be capable of displaying views of the destination bins in addition to views of the source bins. This may allow, for example, for a user to designate a particular location to which a grasped object should be delivered. In another example, the user may designate an orientation for the target object. Alternatively, or in addition, the interface may display a view of a source bin, and allow the user to indicate which objects to grasp from the source bin. The system may then automatically deliver the grasp target to a predetermined target location (such as an expected location of a target bin).

In either case, there may be multiple target locations accessible at a given pick station. Two or more icons or interactive elements maybe presented on the interface to allow the user to choose between different target locations. For example, the embodiment depicted in FIG. 3A includes three icons 304-1, 304-2, and 304-3 (receptacles with downward facing arrows) to indicate different target locations. In this example, selecting one of the target location icons after selecting a gripper target may deliver the grasped object to a destination location associated with the selected icon.

If the user is enabled to select a particular target location (e.g., via a camera view of a destination bin or receptacle), the user may indicate a target location through, for example, a tap or click at a location at which the target object is to be placed.

Alternatively, or in addition, the system may allow a user to specify a location or a pattern that the robot should employ when delivering grasp targets in the future and/or a sequence or ordering for placing the objects in the designated positions. For example, the target receptacle may be an egg carton or apple carrier, in which objects are placed in a grid configuration. The user may select multiple points on the interface to designate locations in a grid into which object should be placed. The robotic system may first deliver an object to the first grid location, then the next target object may be delivered to a second grid location, etc. When all grid locations have been filled, the conveyor associated with the destination receptacle may move the filled receptacle out of the way and replace it with a new receptacle, and the process may be repeated.

Optionally, the system may optimize or normalize the user's selections—for example, if the user selects points in a 4×4 grid, with each point separated by an average of three inches, the system may equalize the distance between the points so that they are evenly spaced. The system may also, or alternatively, auto-complete a grid or other pattern if the system recognizes that the user has entered more than a predetermined number of points corresponding to the grid or pattern.

The user may interact with the camera view to indicate where and/or how a given object should be grasped. The user may indicate, through the interface, where the edges of a gripper target are located. The robotic system may then deploy the grasper to the targeted location and attempt to close the grasper around the indicated edges.

Figure 3B:
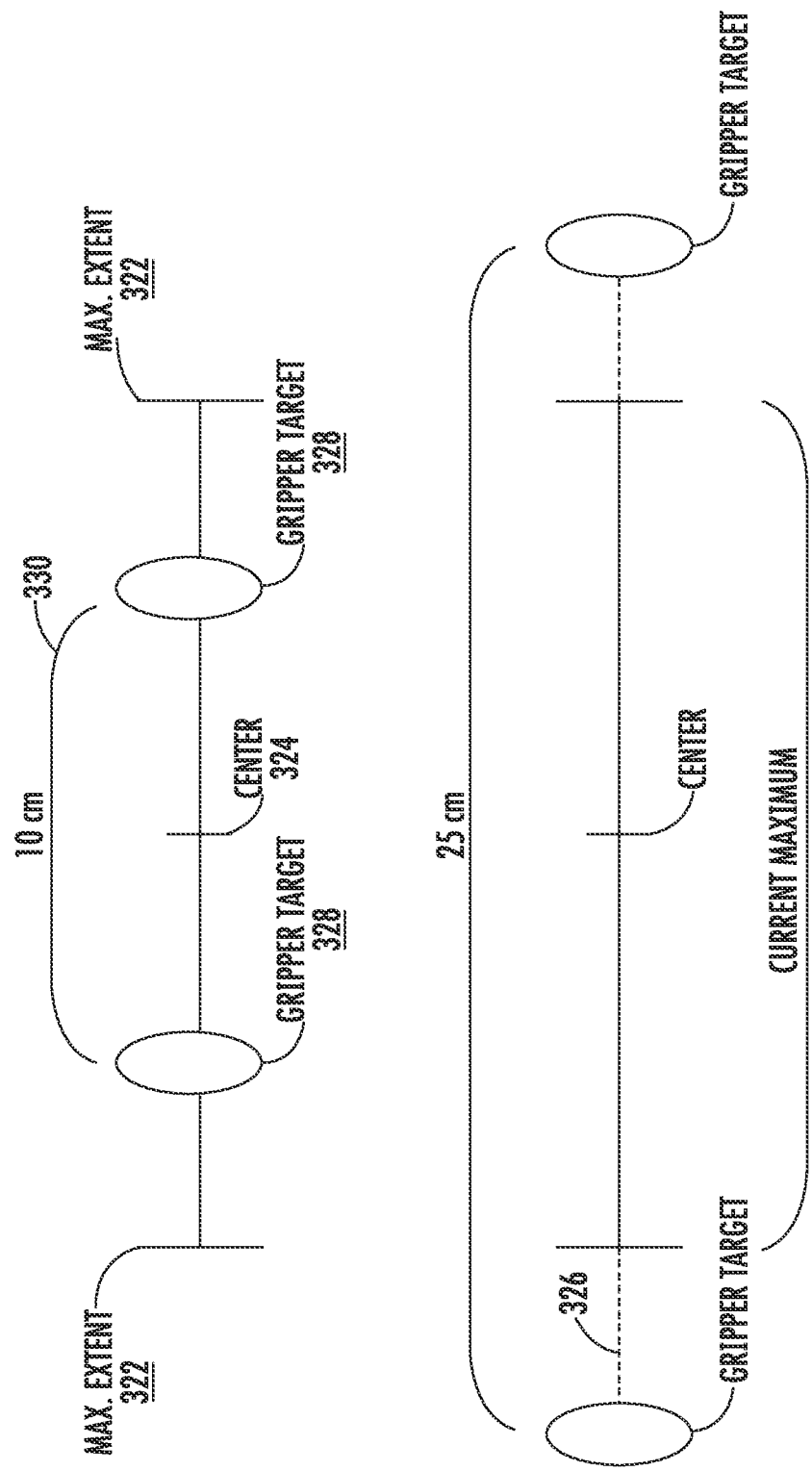

Generally, the gripper target edges may be indicated in the interface using an exemplary gripper display element, as depicted in FIG. 3B.

Referring to the top view in FIG. 3B, the interface element may include gripper target 328 visual elements the represent the ends of the actuators in the gripper. A location of the gripper targets 328 may correspond to a location where the gripper will position the actuators at the beginning of a grasping operation of a physical target object. The interface element may include a line 330 representing an axis of the gripper (e.g., an axis along which the actuators are arranged).

The interface element may also include one or more lines or tick marks along the axis line representing a minimum or maximum extent 322 to which the grippers can deploy (e.g., the minimum or maximum spacing accessible to the actuators, which may include spacing accessible by negative inflation of the actuators). A center point 324 of the axis may be marked between the marks indicating the minimum or maximum extent(s) of the actuators. The center point may be indicated by a point, a tick mark, a dashed line, etc.

In some embodiments, the minimum/maximum extent may be the minimum/maximum extent accessible with the grippers in their current configuration; for example, if the grippers are mounted on rails, the minimum/maximum extent may reflect the minimum/maximum distance to which the grippers can be extended given their current spacing along the rails. In other embodiments, the minimum/maximum extent may be the minimum/maximum extent accessible by the grippers if the grippers are reconfigured (e.g., the minimum/maximum extent accessible along the rails, even if the actuators are not currently deployed at their minimum/maximum spacing). The former embodiment may be useful in situations in which the actuators are manually adjustable along the rails, potentially requiring that a user interact with the robotic system to physically move the actuators. The latter embodiment may be well suited to applications where the actuators can be automatically moved along the rails by means, e.g., of a motor, pneumatic, or hydraulic system.

In still further embodiments, the system may indicate both the minimum/maximum extent that is currently accessible and the minimum/maximum extent that would be possible with reconfiguration. For example, the system may mark the currently accessible minimum/maximum extent with a solid line and/or a line in a first color or shade, and may mark the minimum/maximum possible extent with a further dashed line 326 and/or a line in a second color or shade. The further dashed or shaded line 326 may extend along the axis and may terminate in two further marks indicating the minimum/maximum possible extent.

According to exemplary embodiments, a user may interact with a haptic display through a one-finger or two-finger gesture to indicate where the robotic system should deploy the actuators of the gripper. The user gesture may further include more than two fingers to indicate deployment of the actuators, especially in embodiments that include more than two actuators. The interface may display a number of gripper targets 328 corresponding to the location at which the actuators (in some embodiments, the location at which the distal tips of the actuators) will be deployed. The interface may also include an indication 330 of the spacing between the gripper targets (e.g., a quantitative indication).

Figure 3C:
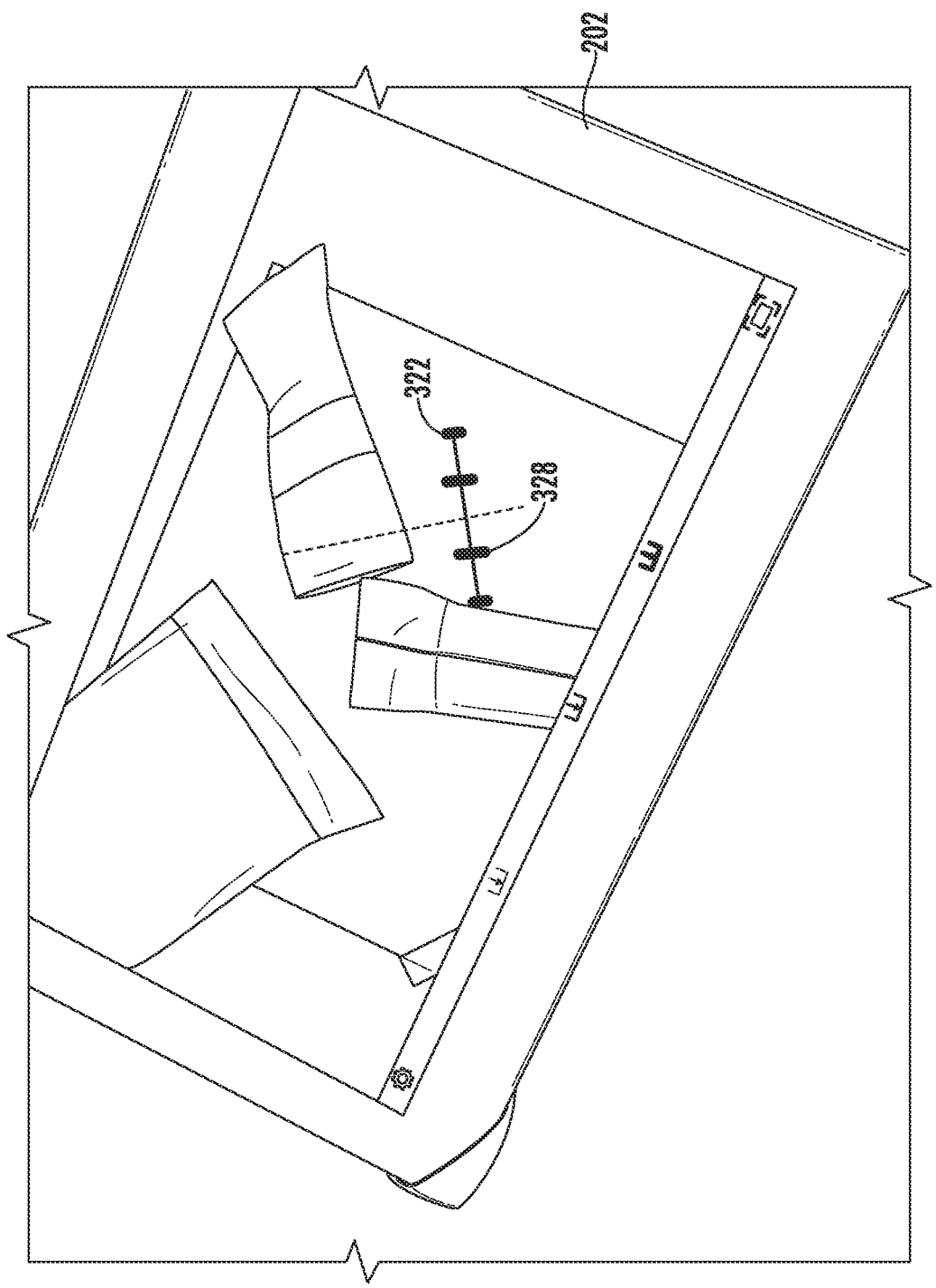

FIG. 3C depicts an exemplary gripper display element imposed on a camera view to enable a user to set the gripper targets, for example, for a grasping operation.

In a one-finger embodiment, a user may make initial haptic contact with a touch screen (or may otherwise indicate an initial contact point, e.g. using a mouse or other input option). In one example, this point may serve as the initial gripper target. The user may then drag the initial input to a second location, which may serve as a second gripper target. The indicator on the interface may reorient and/or reconfigure itself as the user moves the initial contact. Alternatively, the user's initial contact may identify a center point at which the user intends to deploy the gripper (e.g., corresponding to the center mark identified above). When the user drags the initial contact, the amount of distance dragged may identify a spacing between the gripper targets.

In a two-finger embodiment, a user's initial haptic contact with the interface may identify the location of the first gripper target, whereas a second haptic contact may identify the location of the second gripper target. In another embodiment, the first contact may identify the center location and the second contact may identify the location of one of the gripper targets—the other gripper target location may be inferred based on the distance between the center point and the explicitly specified gripper target.

In either case, the system may optionally displace the displayed gripper targets by a predetermined distance away from the location of the haptic contact, if the contact is specified through a touch display. This may allow the user to view the gripper targets on the display without the gripper targets being obstructed by the user's hand or fingers. In further embodiments, the system may allow a user to zoom in on the interface in order to provide for more fine-grained selection of gripper targets.

In some embodiments, the interface may enforce a limit such that the user is not permitted to move the gripper targets beyond the indicated maximum extents. For example, once the user moves the gripper targets to the indicated maximum extents, further movement beyond the indicated maximums may not result in further movement of the gripper targets (e.g., the gripper targets may "stick" to the maximum extents, as shown in FIG. 3D below).

In other embodiments, the interface may allow a user to set gripper targets that extend beyond the maximum extent indicated on the interface element. Due to the deformable nature of soft robotic grippers, the soft actuators may be capable of making sufficient contact with an object (using a grasp surface of the actuator) such that the gripper is capable of grasping an object larger in size than the maximum extent. Accordingly, the system may attempt to grasp the target object as closely as possible at the gripper target points indicated by the user; if a suitably strong grip cannot be achieved after a predetermined number of attempts, then the system may abort the attempt. Optionally, the system may attempt to stir the bin and/or otherwise rearrange the contents of the bin in an attempt to present a more graspable face of the target object to the user; such techniques are described in more detail below.

Figure 3E:
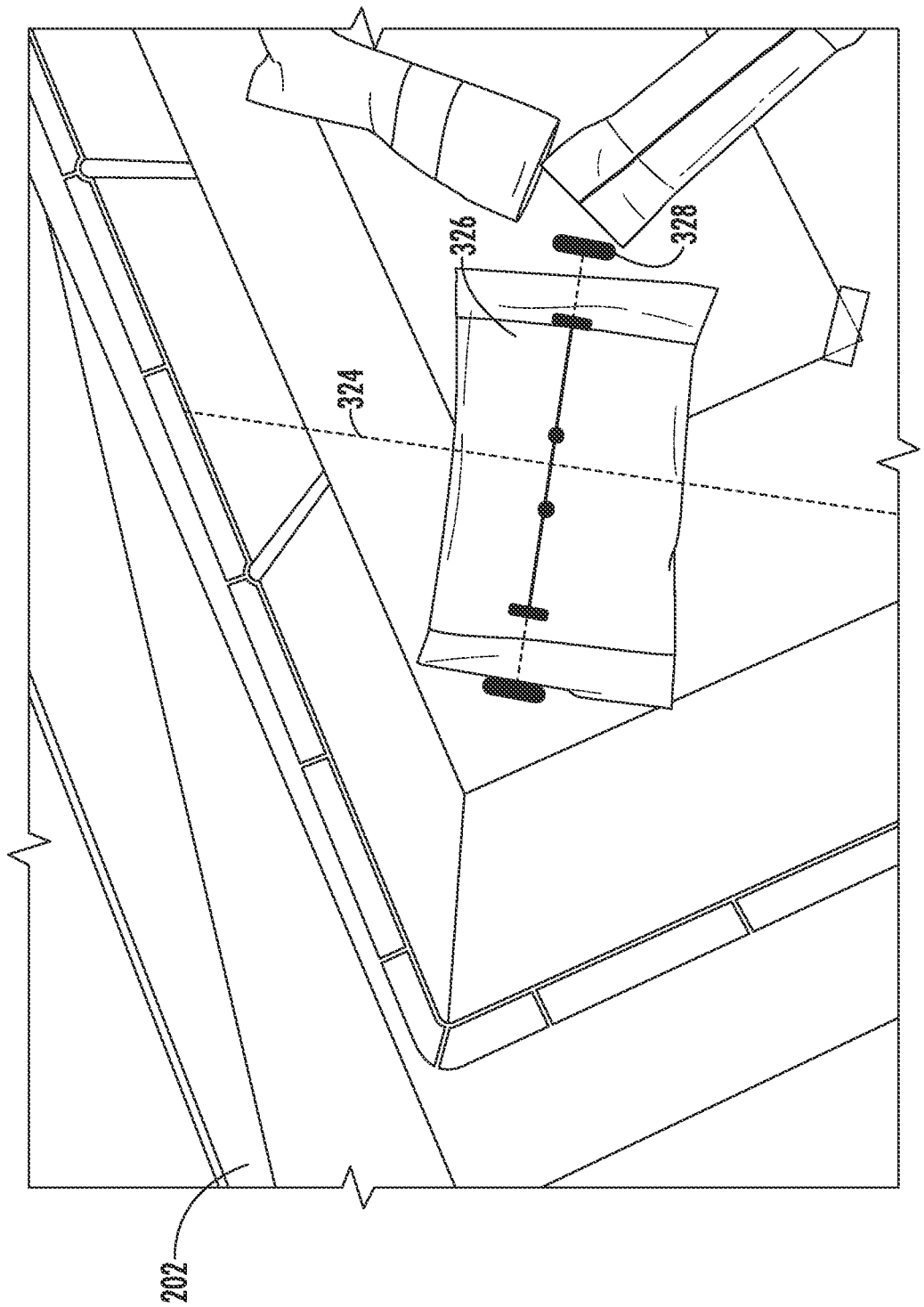

When a user attempts to set gripper targets that extend beyond the maximum extent, the interface may indicate that the user is attempting to do so and may indicate the amount of extension beyond the maximum extent that is being requested. The interface may, for example, set the gripper targets beyond the lines for the maximum extent and indicate the amount of the additional extension requested, e.g., by dashed lines or lines of a different color, as indicated by the bottom drawing in FIG. 3B and in FIG. 3E.

Figure 3F:
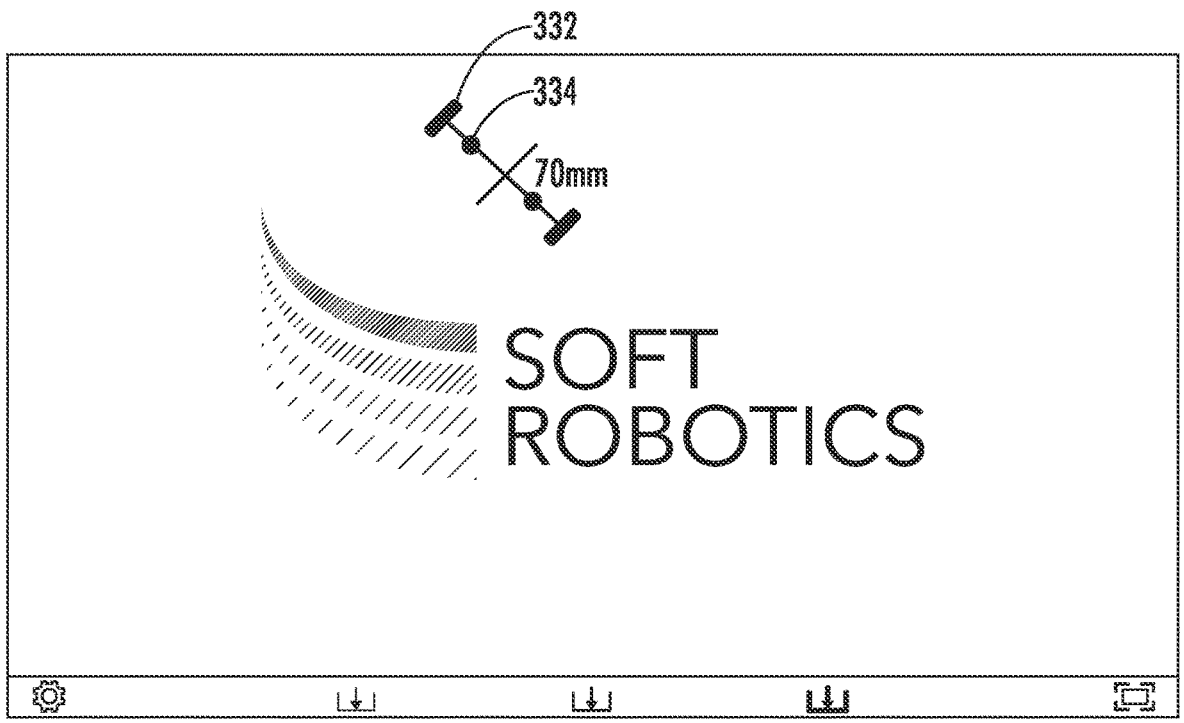
Figure 3G:
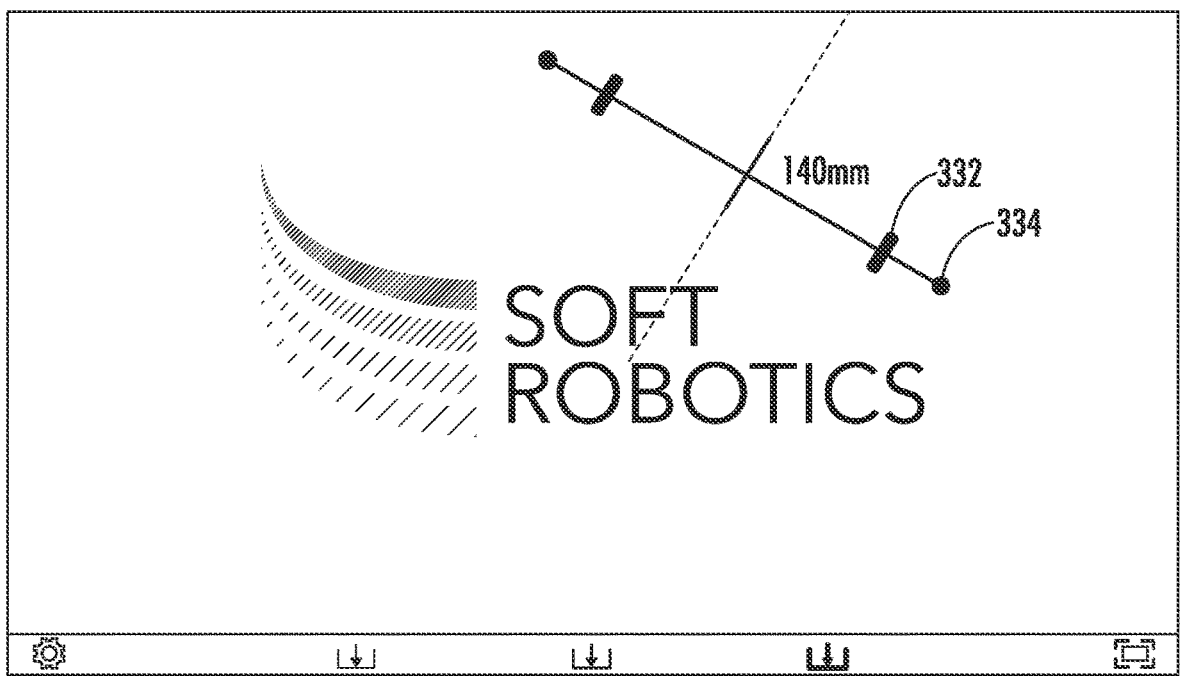
Figure 3H:
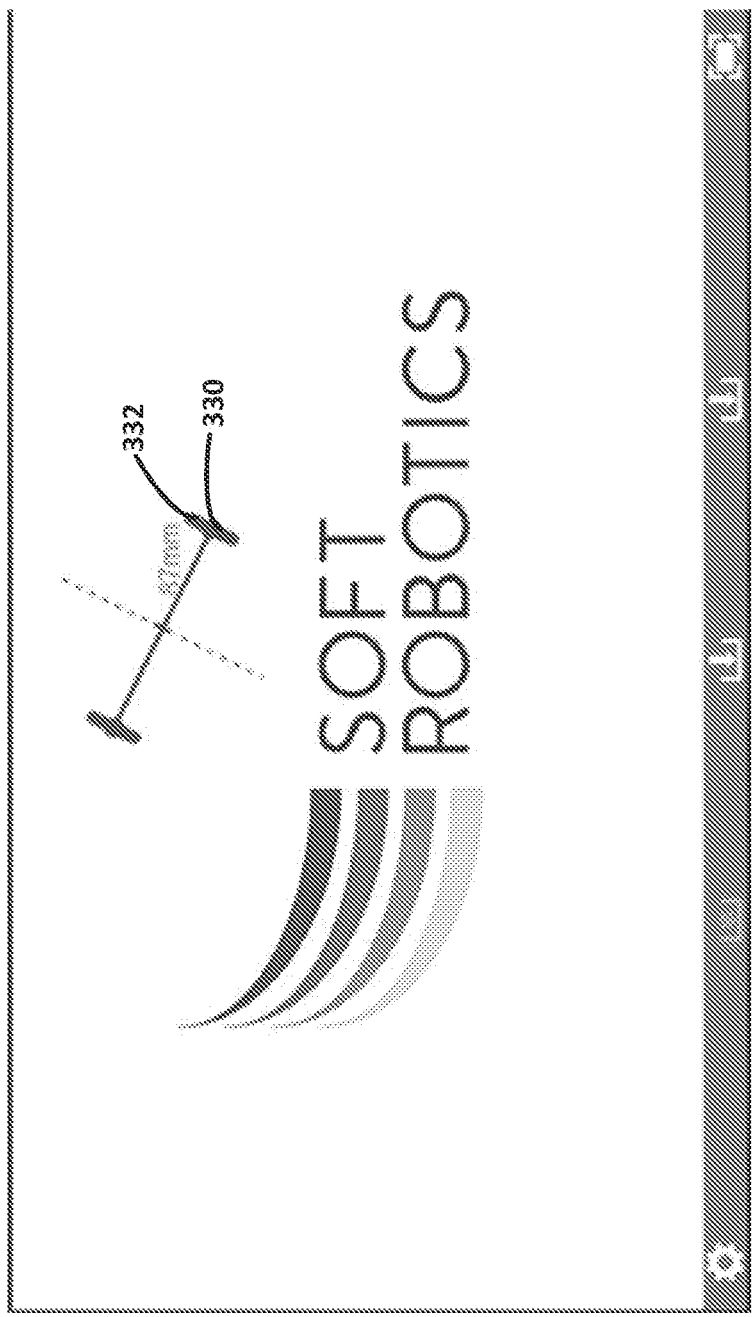

An alternative interface element is depicted in FIGS. 3F-3G. In these examples, the circles 334 represent locations on the haptic interface that a user has touched (i.e., haptic contacts), whereas the rounded bars 332 indicate the grasp capabilities for the tool. Depending on whether the user is attempting to grip below the minimum grasp capabilities of the tool (FIG. 3F) or beyond the maximum grasp capabilities of the tool (FIG. 3G), the rounded bars may move to the respective minimum/maximum locations to show where the actuators will actually grasp the object. When an attempted grasp is in-bounds (FIG. 3H), the rounded bars may fall directly on top of the haptic contact points to indicate that the gripper will deploy the actuators at the requested locations.

Optionally, after initially setting the gripper targets, the user may adjust the gripper targets by interacting with the interface (e.g., selecting one or more gripper targets and moving them, moving the center point, etc.).

The camera view may be a two-dimensional view, and accordingly the user may be capable of designating the initial placement of the actuators in two dimensions (e.g., the x/y dimensions). However, the robotic system may operate in three-dimensional space. The robotic system may move the actuators to the designated x/y location along a path in the z-direction (as described in more detail in the visualization section, below) until the gripper is in close proximity to the target object. For example, the gripper may be provided with a range sensor that may detect a distance to a target to be grasped. When the sensor indicates that the object is in the vicinity of the gripper, the gripper may be actuated to grip the object.

In some embodiments, the center point of the gripper may be moved towards the x/y location of the center point indicated on the display. The actuators may initially be unactuated. Alternatively, if the gripper spread indicated on the interface would require negative actuation/inflation in order to be achieved, the actuators may be fully negatively inflated or partially negatively inflated by an appropriate amount.

In other embodiments, the grippers may be partially actuated in order to approach the designated x/y locations with the grippers deployed as closely as possible to the locations indicated on the interface. These embodiments may be useful in situations where the source bin is relatively cluttered or full, and may allow for the gripper to approach the target object as precisely as possible while avoiding neighboring objects.

In some embodiments, the user may be provided with an interactive element on the interface to activate a "flutter" effect on the actuators. When the actuators are fluttered, they may rapidly partially actuate and de-actuate while approaching the grasp target, thereby allowing nearby objects to be moved out of the way as they approach the grasp target. In some embodiments, the system may automatically flutter the actuators, either as a matter of course or under certain conditions (e.g., when a cluttered environment is detected).

Furthermore, the user may be permitted to flutter the actuators while the actuators grasp a target object (e.g., while the actuators are in contact with the target, to slightly manipulate the object so that more of the gripping surface is exposed). This motion may be followed by a gripping action to acquire the object for transport out of the bin.

The above-described concept may be modified to suit other gripper types. For example, if a three- or four-actuator gripper is employed, the system may display an appropriate number of gripper targets in an appropriate configuration. Similar interactions to those described above may be used to set the gripper targets on the interface. For example, the user may initially place a haptic contact at a center location, and then move their initial contact or place an additional contact to move the gripper targets out from the center or in towards the center. Alternatively, or in addition, the user may tap at various locations on the screen to indicate preferred locations for the gripper targets. The system may determine a deployment configuration for the actuators that is compatible with the physical constraints of the gripper but also matches the preferred locations as closely as possible.

In some embodiments, the interface may also include an interactive element allowing a user to designate a force to be applied to the grasp target. For example, the system may pop up a force menu when the gripper targets are set. Alternatively, or in addition, the system may register a three-dimensional touch force on a haptic display, or may include an input field allowing the grasp force to be specified. In another example, a drop down menu may allow a user to set a grasp force to be applied until changed.

The grasp force may be specified quantitatively (e.g., 10 N) and/or qualitatively (e.g., low, medium, or high). In some embodiments, the grasp force may be selected from among a predetermined set of possible grasp forces. In other embodiments, the grasp force may be specified within a predetermined range between the minimum grasp force and the maximum grasp force the gripper is capable of (or configured for) exerting.

The interface may also permit the user to queue different grasps. For example, upon specifying the gripper targets and/or selecting a destination icon to specify a destination for the target object (or otherwise finalizing the grasp), the robotic system may begin executing the grasp. It may take some time for the robot to grasp the target object and move it to its destination. During the time that the robot is otherwise occupied, the user may interact with the interface in the same manner as discussed above to indicate further gripper targets. After the robotic system delivers the initial target object to the destination bin, the robotic system may continue to execute further grasps in the order specified. Queues may be specified in other ways, as well.

When the robotic system is executing a grasp, the system may obscure the view of the source or destination bin due to the fact that the robotic arm may be present between the camera and the bin. As a result, the user may not be able to see the camera view in order to queue new gripper targets. This problem may also arise in other situations, such as when the robotic system is executing a calibration routine. In order to address this problem, the system may be configured to capture an image of the source or destination bins (e.g., at predetermined intervals, or just before the robot executes a pick) while the robotic arm is out of view of the camera. This image may then be used in the interface (either temporarily serving as the camera view, or serving as a ghost image partially superimposed on the current camera view while the robotic arm obscures the view) to allow the user to continue to specify gripper targets while the robotic arm is in the way. The "ghosted" image also aids the user in identifying objects that moved, e.g., due to the previous pick action of the gripper, because such objects may become partially transparent like the robotic arm. Objects that remain undisturbed and do not move may appear as normal, opaque objects in the user interface.

In some embodiments, the system may allow a user to specify actuator sequencing; this may be done before, during, or after the gripper targets are specified. For example, the order in which a two-finger gesture is executed may be the order in which the grippers are deployed. Alternatively, the user may specify gripper targets and then select one of the gripper targets to specify the order in which the corresponding actuator should be deployed. When the robotic system approaches the grasp target, the actuators may be actuated independently in the specified order.

Further embodiments may allow for additional gestures to perform specified action. For example, a flicking gesture or some other indication, may instruct the robotic system to rearrange an object or nudge the object out of the way. In another example, a user may draw a circle or execute another gesture on the interface, which may instruct the robotic system to stir the contents of the bin. Accordingly, target objects can be rearranged in order to expose buried objects, to reorient target objects to expose a more graspable surface, and/or to move a target object away from a group of objects, a wall, or a corner of the source bin.

In some embodiments, the user may define the path that the robotic arm takes in order to approach the target object. For example, the user may interact with the robotic system using a glove embedded with sensors, or a camera capable of three-dimensional motion tracking. The user may move their own arm along the path desired for the robotic arm. The sensor(s)/camera may analyze the path of the user's arm and transmit suitable instructions to the robotic arm defining a corresponding path that the robotic arm should take on the way to the grasp target. A similar technique may be used to define the deployment order of actuators, gripper force, etc.

If visualization systems and/or intelligence permit, the interface may allow the user to select a recognized object using a tap or sustained contact. The user may drag the object to a designated target (e.g., a target icon corresponding to a desired destination bin).

Further improvements in visualization systems are described in the next section.

C. Vision Systems

1. Calibration

Exemplary embodiments provide techniques for quickly calibrating either or both of the robotic system and the visualization system, including the cameras.

Typically, the source and destination bins are delivered to an area (e.g., on top of a conveyor belt) whose base is at a relatively fixed location in the horizontal direction (e.g., along the z-plane of an x-y-z coordinate system). This may simplify grasping tasks, because the robot can assume that target objects are likely somewhere between the bin base and the top of the bin. The robotic arm may then be dropped a certain distance before control is turned over to logic based on a range finder in the gripper that performs more fine control. Moreover, the source and/or destination bins may be delivered to approximately the same area each time; accordingly, the robotic system may have a general awareness (e.g., within a certain range) of where in the x/y plane the bins may be located.

However, the robotic arm may occasionally fall out of calibration. In order to recalibrate the robotic arm, a calibration tool may be mounted to the gripper (e.g., a pointed rod for touching relatively precise locations; see the modular gripper example below). The robotic system may be configured to make contact with predetermined calibration elements in order to reset the robotic arm's understanding of the three-dimensional space in which the robotic arm operates, e.g. in an x/y/z or Cartesian reference frame. The robotic arm may further be recalibrated by moving into a predetermined home position and/or using various forms of range detection (e.g., a haptic contact sensor at the end of the calibration tool, a range sensor, etc.). Various sensors deployed in connection with the robotic system (e.g., the range sensor) may also be recalibrated during this process.

Figure 4A:
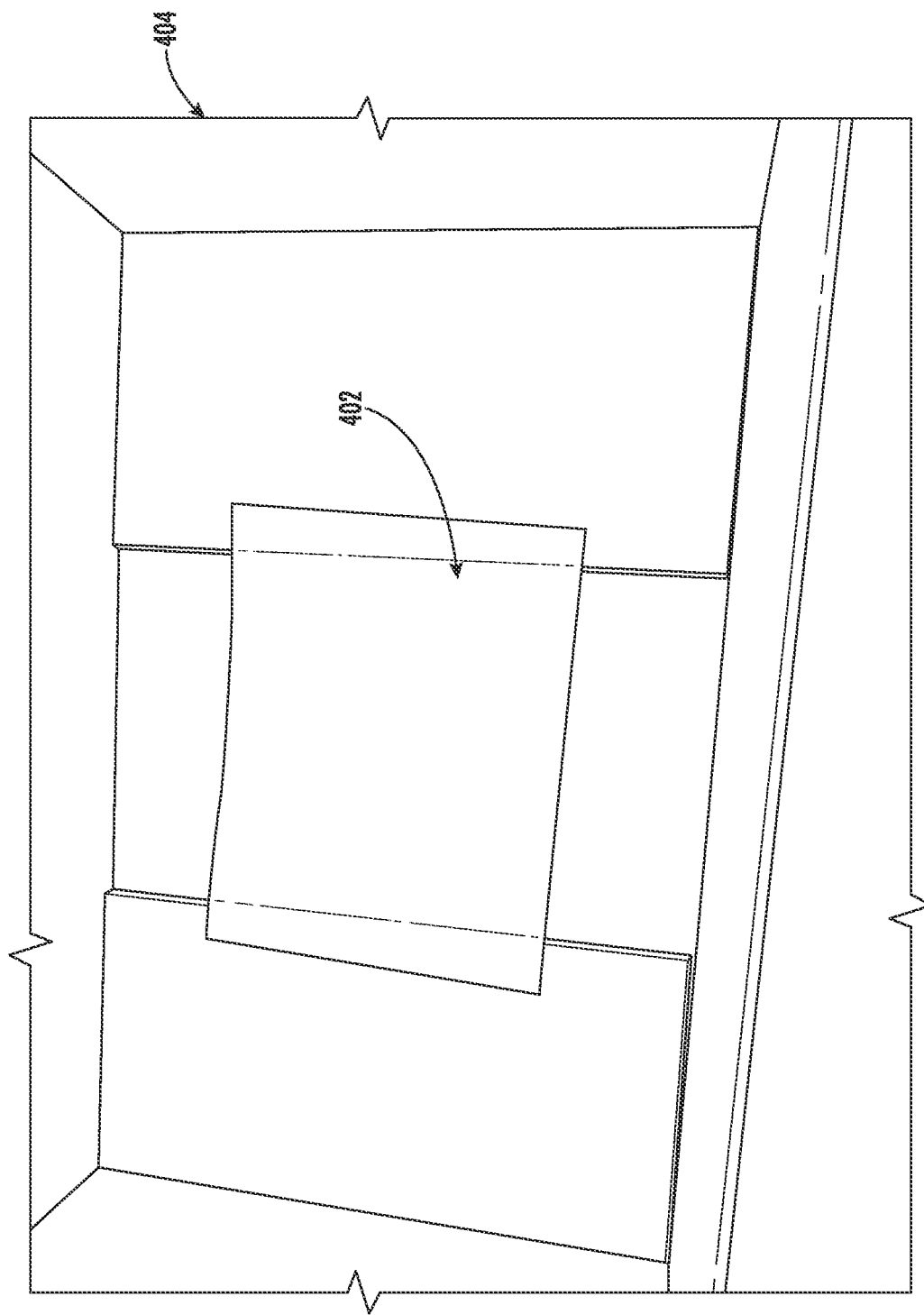

In order to perform recalibration, the bins deployed to the pick-and-place station 220 may be provided with a calibration sheet 402 in a predetermined location, for example, at the bottom of a bin 404 as shown in FIG. 4A.

Figure 4B:
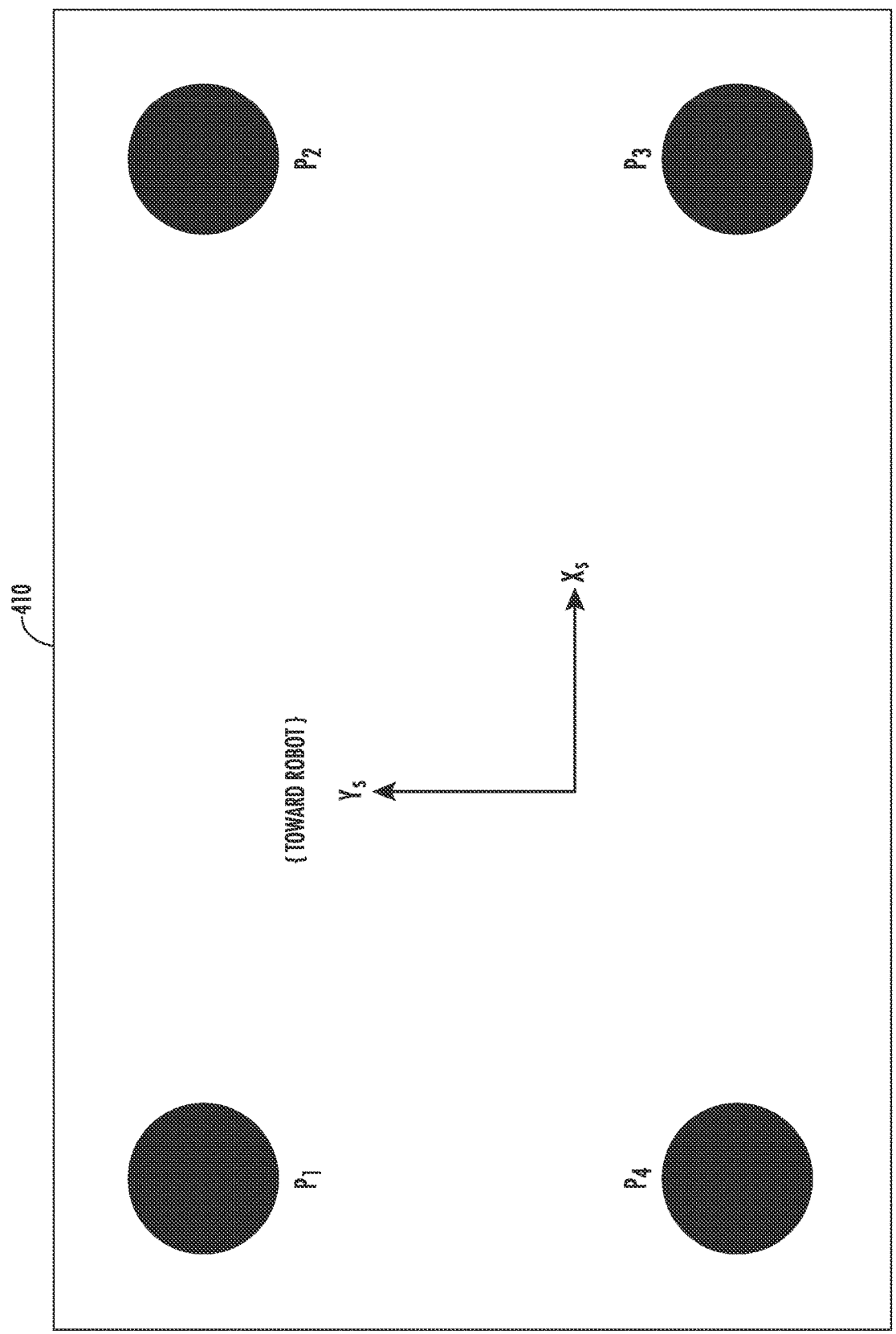

Instead of being blank, a calibration sheet 410 may include a predetermined pattern of visual elements, as shown, for example, in FIG. 4B. The robotic system may be configured to use the camera image and/or one or more sensors to cause the calibration tool to contact the visual elements in sequence in order to recalibrate the x-, y-, and/or z-positioning of the robotic system. In the illustrated example, the robotic system may move the calibration tool to points $P_1$, $P_2$, $P_3$, and $P_4$ in sequence.

The system may perform a calibration check at a variety of intervals using a target located at a common way point/safe height position for the robot. Accordingly, the range sensor may be checked against a target at a known distance (single height check) from a robot position (e.g., at the start of every pick cycle, or after a set interval of pick cycles, or after a difficult pick attempt, such as an attempt where gripping retries were executed) to verify that the range sensor is reading within a prescribed tolerance band. Similarly, a periodic single height range sensor check may be used to verify there is no foreign object present, e.g. debris blocking or affecting the range sensor accuracy.

If an anomaly is observed in the range sensor reading, the robot may move to a gripper cleaning position at a station within the work envelope of the robot that provides an external gripper cleaning. For example, the station may provide a blow off function (e.g. an air puff plus vacuum) and a target-to-range sense to confirm the sensor protective cover is cleaned off. Failure to fix the issue by cleaning the sensor protective cover may indicate some type of sensor malfunction or drift, allowing a repair or maintenance technician to catch the issue before failed attempts are made at picking objects. The cleaning position may also, or alternatively, be the position above which the robot parks before or after a pick cycle, where the range sensor check is repeatedly performed.

According to some embodiments, the calibration patterns may also, or alternatively, be used to calibrate or canonicalize the camera(s) or visualization systems. For example, the bins may not necessarily be delivered to the pick station perfectly oriented—new bins may be skewed by various amounts each time they are delivered to the station.

Because it may be difficult for a user to interact with a system in which the view of the bins appears differently each time, the camera may use the calibration pattern and/or other cues (e.g., the edges of the bins as detected by edge detection software) in order to manipulate the view (e.g., skewing or reorienting portions or all of the image) in order to offer a standardized or canonical perspective. The system may canonicalize the view on a regular basis, upon the occurrence of predetermined events (e.g., when a new bin is delivered to the pick-and-place station, or after each object picking by the gripper), and/or based on a command from the user.

2. 3D Locating

Robotic systems move in a three-dimensional space, so detecting that movement relative to grasp targets and place locations may be important. Some embodiments may include a depth camera capable of measuring the three-dimensional location and shape of objects in the camera field of view. Other embodiments, such as the exemplary embodiment described below, may instead use a two-dimensional camera with improvements to support three-dimensional locating and robotic control while still obtaining acceptable three-dimensional grasp results.

When a two-dimensional camera provides a top-down view from a central location, the camera may provide an estimate of an x/y location at which an object is located but may not be able to localize the object in the z-direction. An example of a top-down image captured by a centralized camera is shown in FIG. 4C, which shows a bin 404 and a top-down view of an object 420.

Figure 4D:
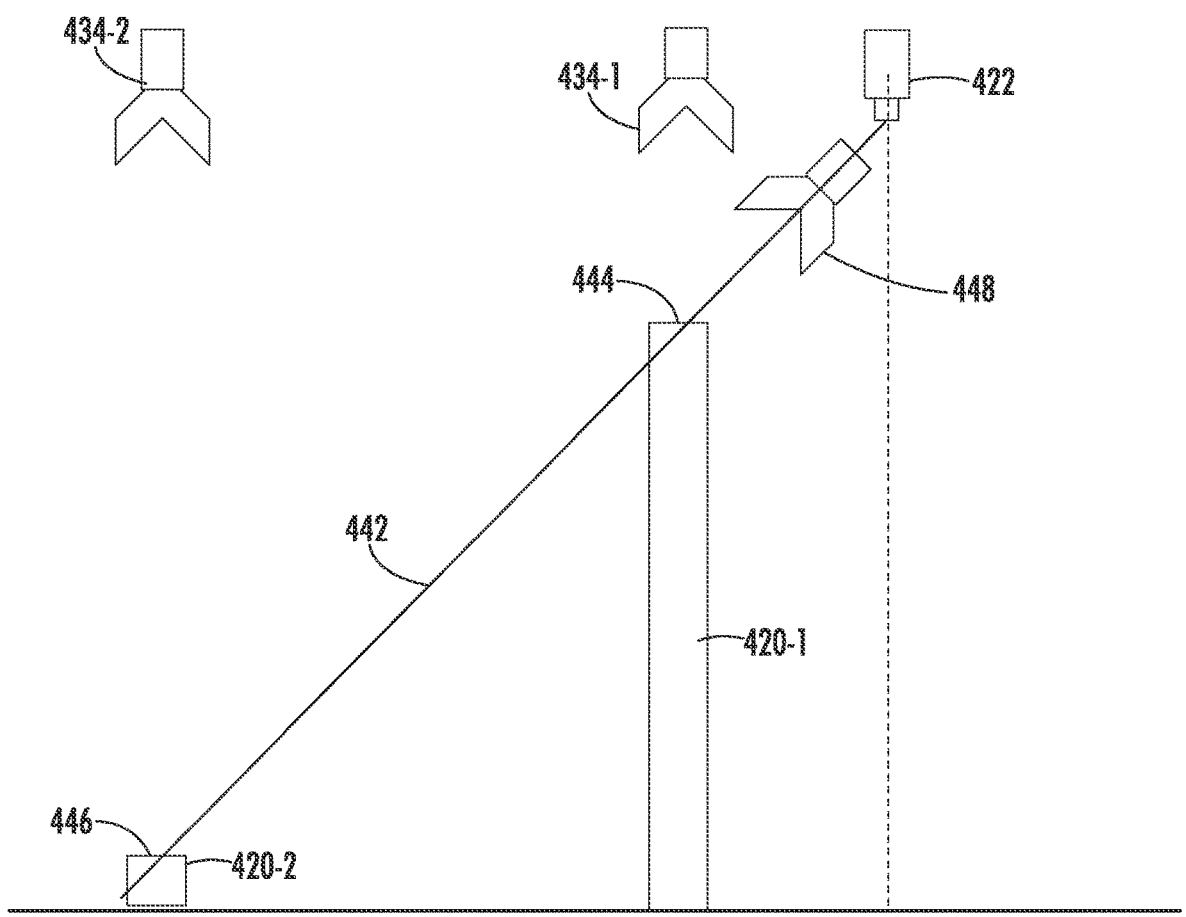

The illustrated view of the object 420 may be the result of a relatively tall object located close to the camera, or a relatively short object located further away from the camera, as shown in a side view in FIG. 4D.

In this example, a vector 442 drawn from the camera lens 422 to the top of the object 420 passes through both the relatively close location 444 (having a relatively large height in the z-plane) and the relatively far location 446 (having a relatively small height in the z-plane). With a two-dimensional camera system, it may not be possible to determine from the image alone whether the object 420 is relatively tall and located close to the camera (420-1) or is relatively short and located far from the camera (420-2).

Accordingly, if the system attempts to make a guess as to the precise x/y location of the target object and the robotic arm approaches the object from directly above the guessed location, it is possible that the robotic arm will drop towards the object but have nothing below the gripper to grasp (as demonstrated by the gripper representations 434-1 directly above the target object 420-1, and gripper 434-2 above target object 420-2 in FIG. 4D).

In order to avoid this problem, the robotic arm may instead approach the object along the vector 442 drawn from the camera 422 to the target object (as shown by the angled gripper representation 448 in FIG. 4D). This may be accomplished, for example, based on the x/y position of the gripper targets 328 and/or center point 324 as designated in the interface, and a known location of the camera relative to the gripper targets and/or center point.

This approach ensures that the gripper will eventually approach the target object, regardless of the target object's height. A range detector in the robotic arm may detect a range to the target object, and actuate the actuators when it is detected that the target object is in range of at least the tips of the actuators.

In some cases, it may be difficult to obtain an accurate range based on the range sensor. For example, many range sensors work by transmitting electromagnetic waves toward a target object and receiving the reflected waves back at a sensor. However, some objects scatter electromagnetic waves, making it difficult to achieve an accurate range reading.

Accordingly, the robotic system may lower the grasper until the range sensor indicates that the grasp target is within reach. This may represent a first predetermined drop/approach distance. The system may then attempt to grasp the object by actuating the actuators. If one or more sensors (e.g., contact sensors such as a contact-sensitive skin in the actuators, force detection sensors, the camera, etc.) detect that the object has not been sufficiently grasped (e.g., the object is not held by the actuators, or the object is not held with sufficient force), the robotic system may descend by a predetermined amount from the first predetermined drop distance and try again. This process may be repeated until a sufficient grasp is achieved, or until the attempt is aborted (e.g., after a predetermined number of failed attempts). The predetermined drop distance and predetermined amount of descent may be automatically or manually reconfigured.

In some embodiments, other parameters may also, or alternatively, be adjusted. For example, the system may adapt the force applied to the target object based on the grasp quality (when grasp quality is detected to be poor, the system may apply increased force by supplying further inflation fluid to the actuators, and vice versa).

Typically, the system will attempt to grasp the object as specified by the user in the interface. For example, the system may rotate the gripper base to deploy the actuators at the angle and/or distance as specified for the gripper targets in the interface. However, this behavior may be overridden in certain conditions.

For example, the system may adapt the grasp location based on grasp quality. If the sensors and/or camera detect a poor grip, the gripper may be rotated and/or translated in an attempt to grab a longer or otherwise more graspable surface of the target object. In another example, the system may alter the rotation of the gripper and/or grasp location to avoid collision with the bin or neighboring objects. The system may adapt the gripper differently depending on the particular type of collision to be avoided. For example, when approaching the side of a bin, the gripper may reorient itself so as to deploy the axis of the actuators either parallel or at a ninety-degree angle to the side of the bin. This determination may be made depending on the configuration of the object to be retrieved. On the other hand, when approaching the corner of the bin, the system may orient the gripper so that one actuator approaches the corner while another is disposed towards the interior of the bin. Other approaches and/or configurations are also possible.

In some cases, the pick may be aborted altogether if the system determines that a collision with the side of the bin is inevitable and/or if the user requests that the robotic arm deploy the gripper to a location outside the walls of the bin or to some other off-limits location.

In some embodiments, the robotic gripper may be mounted on a telescoping or fixed rod to reduce the diameter of the robotic arm in the vicinity of the rod. The system may manipulate the path at which the gripper approaches the target object so that the reduced-diameter portion is in the vicinity of the bin edge at given points along the path. In this way, the gripper may be able to approach target objects in relatively confined environments that may not be possible without the use of the rod.

3. Vision Hardware

Further embodiments provide improvements in vision hardware for robotic systems. Many range finding sensors employ a transmitter/receiver pair, in which a signal (e.g., an electromagnetic signal, such as a radio wave or beam of infrared light) is transmitted, bounced off an object, and then received.

Figure 5A:
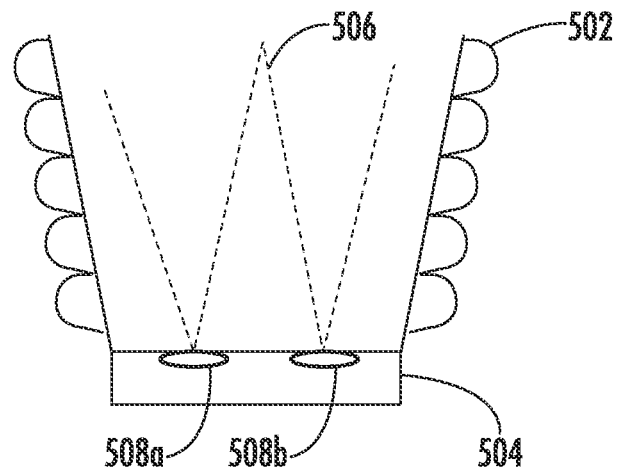
FIGS. 5A-D depict a portion of the exemplary servo-pneumatic control system in unactuated and actuated states, respectively, according to exemplary embodiments.

For example, a range sensor may be mounted in a hub of a robotic gripper, as shown in FIG. 5A (where the actuators 502 are present in at the left and right, the rectangular bottom portion represents the hub 504, and the dotted lines 506 represent electromagnetic energy transmitted from the transmitter 508a and received at the receiver 508b).

When exposed to real-world use, the range sensor may become obscured by dirt or damaged by objects in the environment. Accordingly, in order to protect the range sensor and/or facilitate cleaning, the range sensor may be covered by a layer 510 of transmissive material, such as glass or plastic.

However, a problem may arise in that the covering layer 510 may not be fully transparent to the electromagnetic energy transmitted by the transmitter. Accordingly, the energy from the transmitter may be reflected back by the covering layer and may be received at the receiver, resulting in erroneous range readings, as shown by line 507 in FIG. 5B.

Figure 5B:
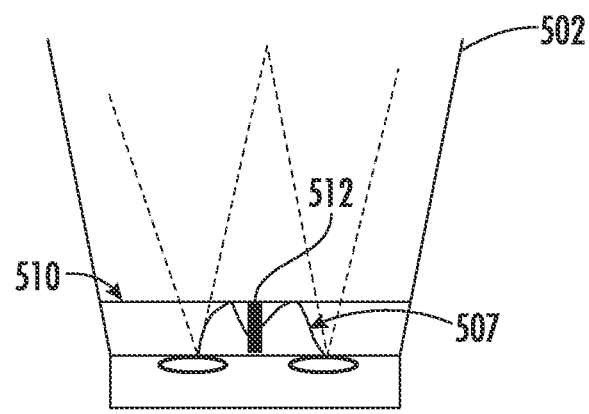

In order to alleviate this problem, a barrier 512 may be placed between the transmitter and receiver. The barrier 512 may be made of any suitable material that will block the energy from the transmitter and prevent the energy from being received at the receiver. The scale in FIG. 5B is exaggerated for illustration purposes.

The barrier may be, for example, of a one-piece or two-piece design for use on emitter/receiver type range sensors. In either case, the designs primarily provide a separation barrier between the emitter and receiver objectives or apertures on the sensor. In some embodiments, the barrier may span the entire gap between the sensor outer surface and the inner surface of the protective cover; in other embodiments, the barrier may span part of the gap.

In the case of a two-piece design, a barrier shape that surrounds the outer perimeter of the sensor may be attached around the sensor, and a matching barrier shape with the addition of a dividing rib or wall aligned to fit between the emitter and receiver of the range sensor may be adhered to the protective cover. When the protective cover is then installed with the two barrier elements in place, the range sensor effectively becomes boxed in and protected from scattered electromagnetic radiation, and has a barrier in place to separate and isolate the emitter and receiver objectives from each other.

Figure 5C:
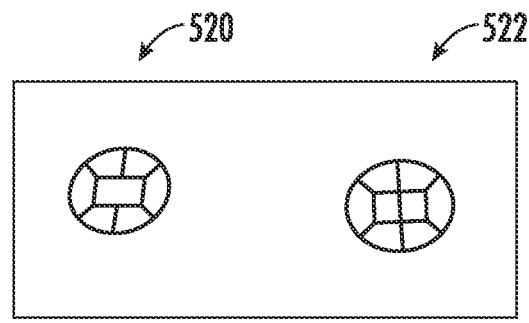
Figure 5D:
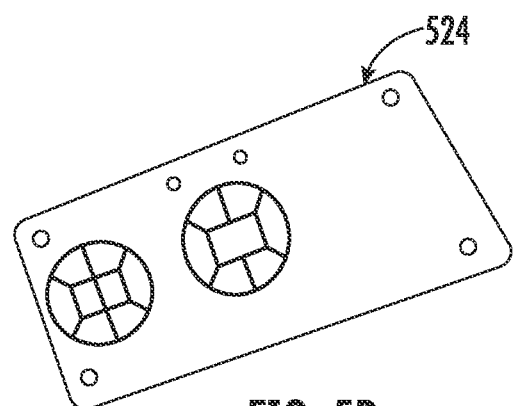

An example of a barrier suitable for use with exemplary embodiments is depicted in FIGS. 5C and 5D. As shown in FIG. 5C, the barrier may include two parts below the covering, one part 520 provided to fit the around the outer edges of the sensor and to support a second part 522, which provides the barrier in a precise location relative to the sensor transmitter and receiver. FIG. 5C shows the two parts in isolation, whereas FIG. 5D shows one part deployed on a robotic hub and surrounding a range sensor 524. The other part 522 mates with the first part 520 and positions the barrier appropriately.

Using the exemplary barrier, the range detector may be protected from environmental factors while nonetheless exhibiting increased detection accuracy.

D. Gripper Configuration

Still further embodiments may include a modular gripper that is capable of being quickly swapped out (either entirely, or specific parts) for another suitable modular gripper. This may allow, for example, for grippers to be swapped for others with different configurations of electronics and/or actuators.

FIGS. 6A-6D show different perspective views of an assembled modular gripper 600. As shown in the front perspective view of FIG. 6A, the gripper 600 may include one or more ports 602 for supplying and/or removing inflation fluid to the actuators and for supplying electrical and/or data connections to sensors or processors. In some embodiments, different ports may feed different actuators such that the actuators are actuatable independently. One or more pneumatic or hydraulic lines may be attached to the ports in order to supply the inflation fluid to the gripper Note also, in the bottom view of FIG. 6D, that the modular gripper 600 may include mounting points 604 for sensors, such as range sensors.

Figure 6A:
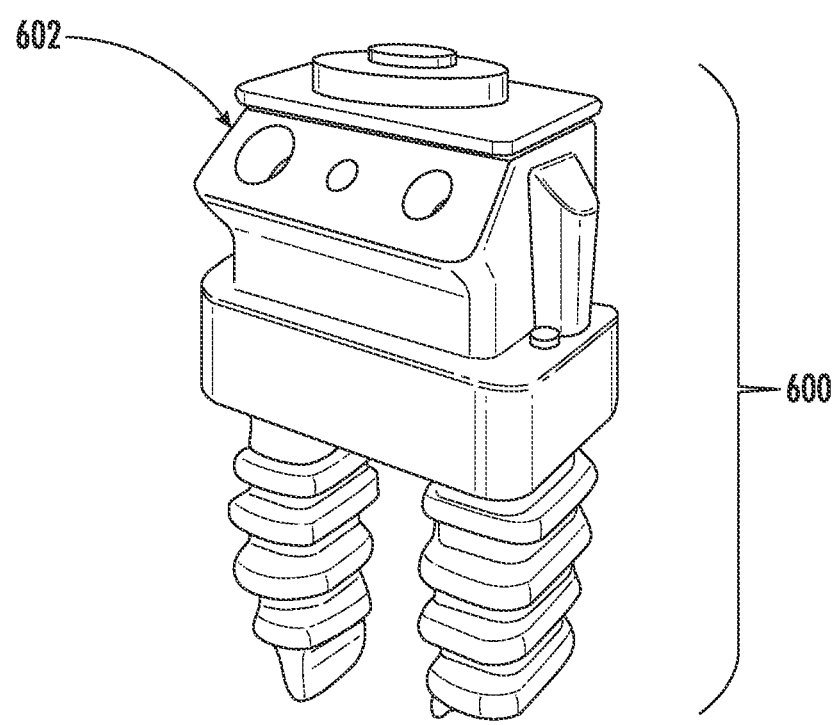
FIGS. 6A-P depict components and views of a modular gripper according to exemplary embodiments.
Figure 6B:
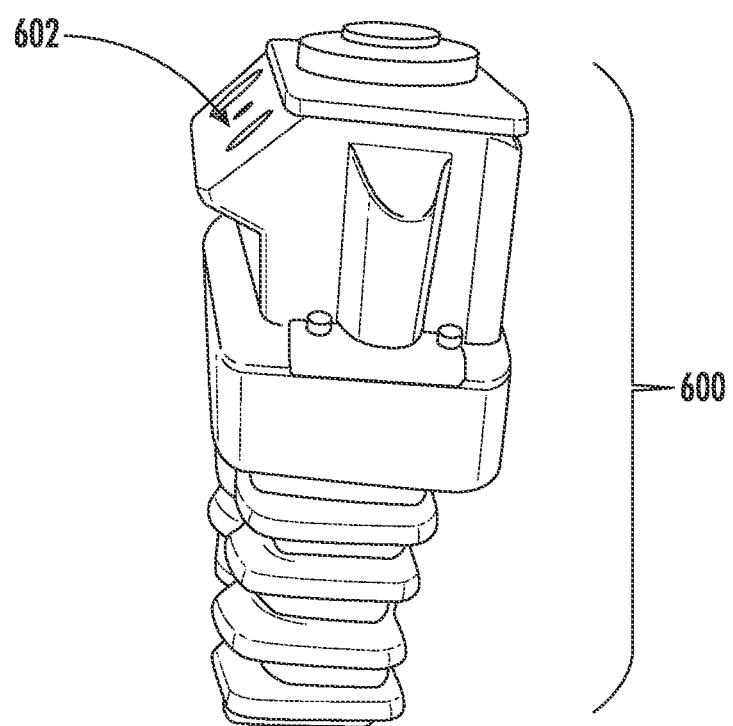
Figure 6C:
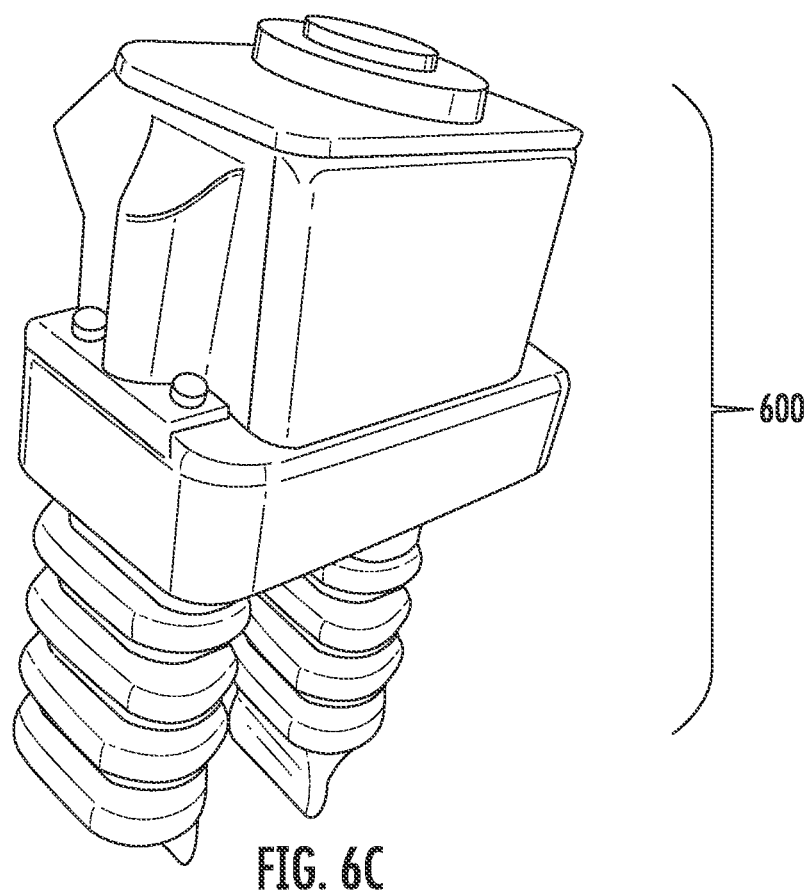
Figure 6D:
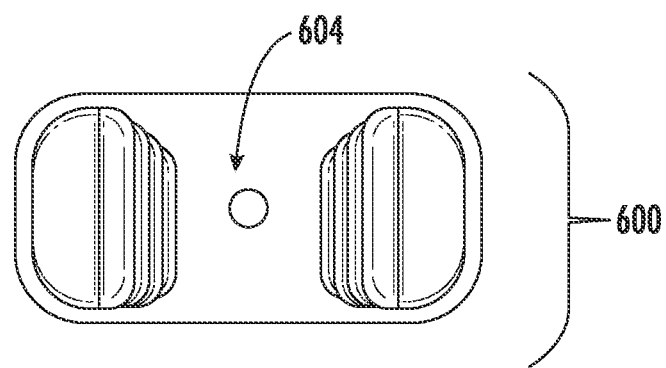
Figure 6E:
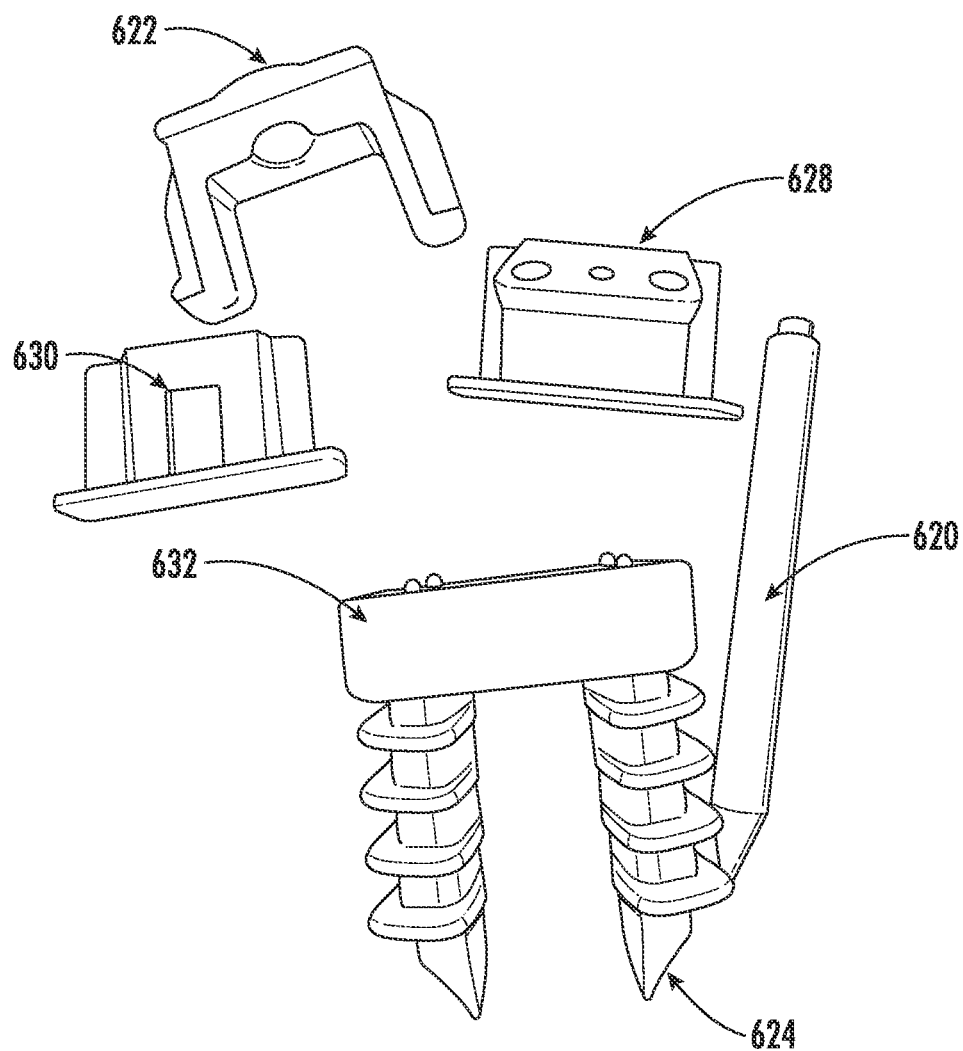
Figure 6F:
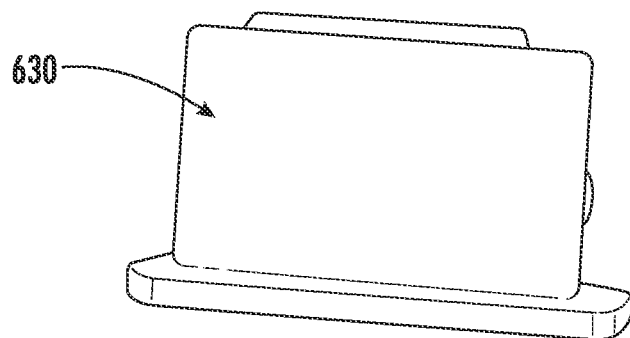
Figure 6G:
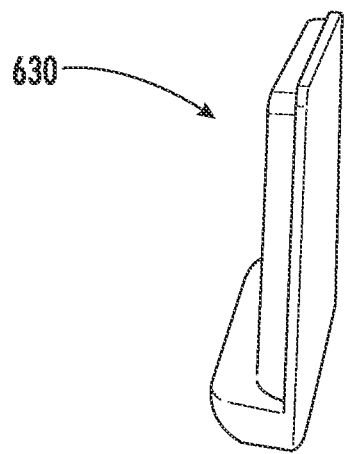
Figure 6H:
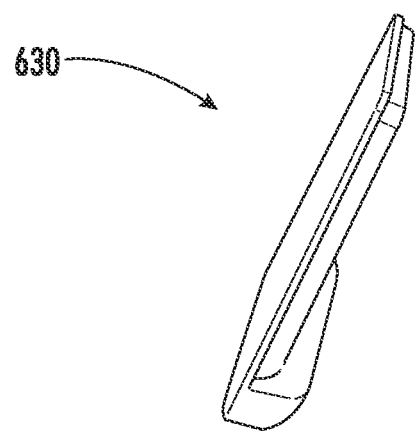
Figure 6I:
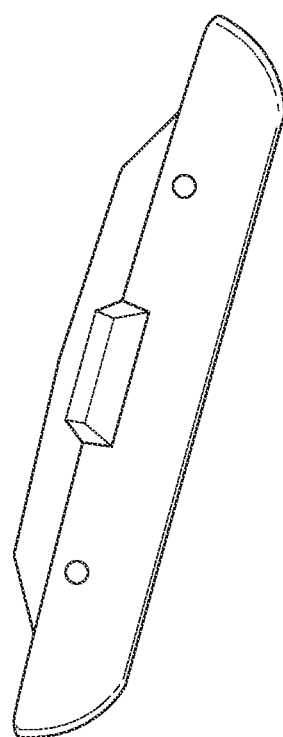

The modular gripper 600 may be disassembled so that one or all pieces may be swapped, repaired, or replaced. FIG. 6E shows the modular gripper 600 of FIG. 6A when disassembled. The rod of FIG. 6E is a calibration tool 610, as mentioned in previous sections, which may be mounted to a hub base part 622 in place of the actuator assembly 624.

Figure 6J:
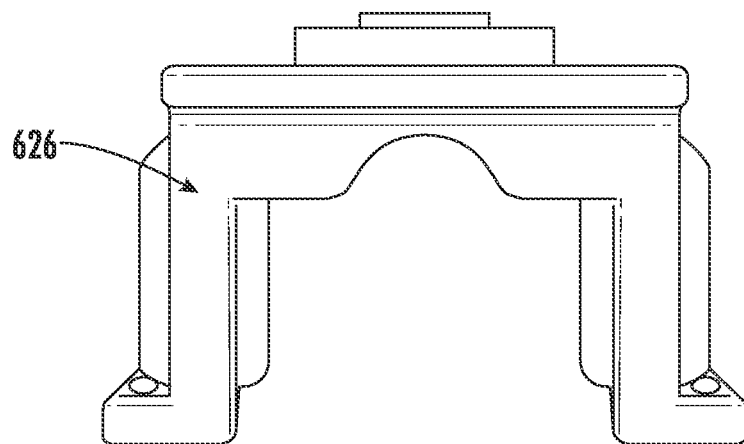
Figure 6K:
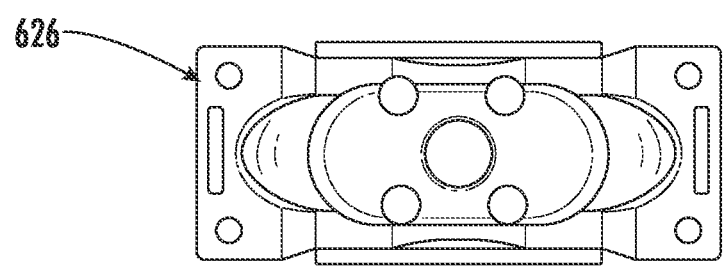
Figure 6L:
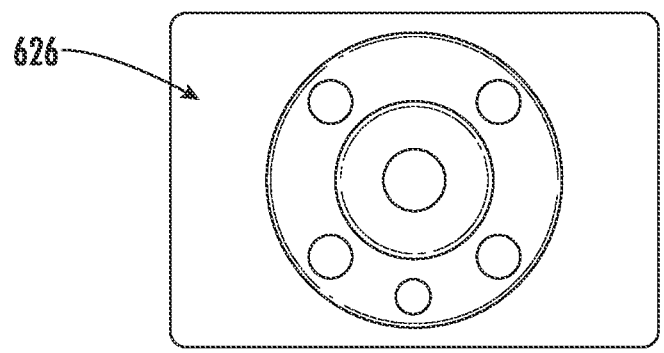
Figure 6M:
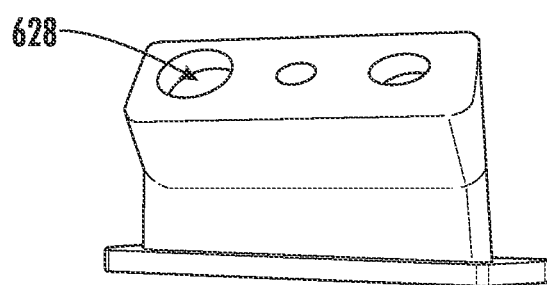
Figure 6N:
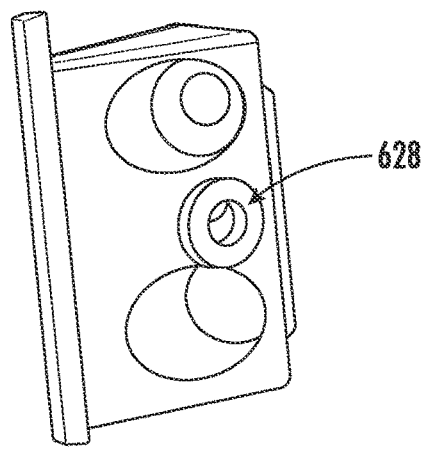
Figure 6O:
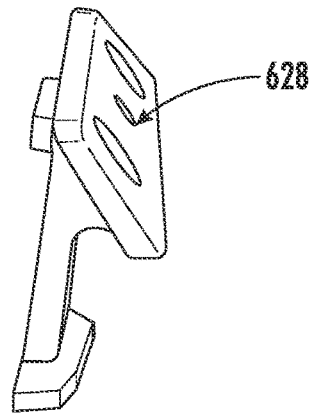
Figure 6P:
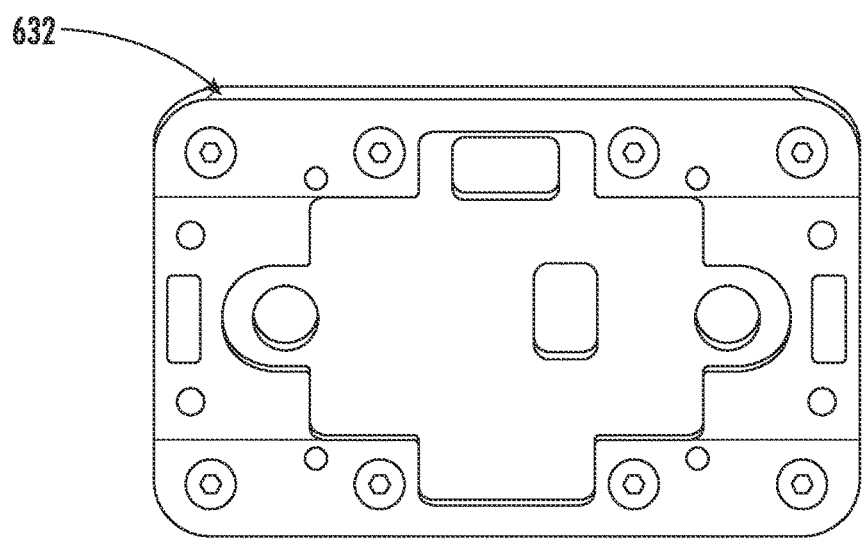

The pieces depicted may be secured by a combination of friction and/or fastening mechanisms, such as screws. To assemble the pieces, the hub base 622 may be secured to the robotic arm via a mount 626, as depicted in FIG. 6L; see also FIGS. 6J (side view) and 6K (internal view). A front support 628 and a rear support 630 may be slid into corresponding slots in the hub base 622. The actuator base 632 may be attached to the bottom of the assembly, e.g. to one or more of the hub base 622, front support 628, or the rear support 630, through screws or a quick-release fitting.

According to some embodiments, the hub base 622 may be configured to remain attached to a wrist flange of the robotic arm when other pieces of the modular gripper is/are removed, swapped, or reconfigured. Therefore, the gripper can be easily reconfigured without affecting the alignment of the gripper to the robotic arm.

Similarly, the hub base 622 may also provide an attachment provision for the robot calibration rod 620, which can be installed and removed without impacting the alignment of the gripper to the robot. This is due to the fact that the gripper is removed from the mounting structure while the calibration rod is installed, and then the gripper is re-installed into specially-configured grooves with alignment and locking features (or other elements) that allow the gripper to be accurately and repeatedly installed.

The modular design of the gripper allows various combinations of side panels (allowing for different controls connections) and even overall gripper designs to be installed on the same mounting structure, and also allows for grippers with different sensing, internal electronics, and even different actuator arrangements to be installed while preserving the same alignment to the robot wrist.

Any or all of the components may be swapped with components having a different configuration. For example, the actuator base may be swapped for a different actuator base having a different type of sensor, while still maintaining the rest of the modular gripper components. In another example, a new actuator base having a different number and/or arrangement of actuators may be swapped in, and a different front support having different inlet and/or outlet ports may also be swapped in to provide for independent actuation of the actuators.

III. Computing System and Network Implementation

Figure 7:
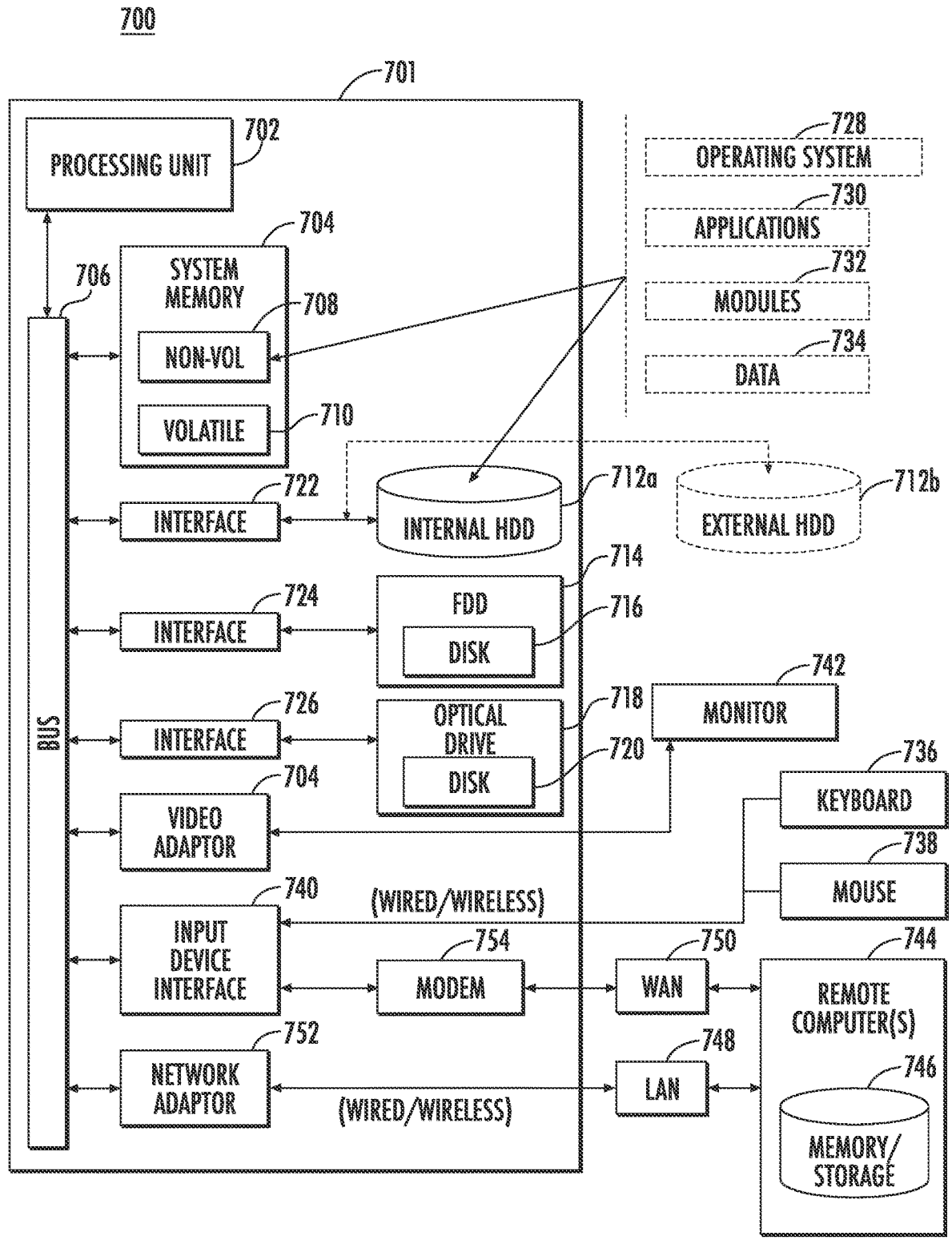
FIG. 7 is a block diagram illustrating an exemplary computing device suitable for use with exemplary embodiments.

The above-described techniques may be embodied as instructions on a non-transitory computer readable medium or as part of a computing architecture. FIG. 7 illustrates an embodiment of an exemplary computing architecture 700 suitable for implementing various embodiments as previously described. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may Alternatively, employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chip-sets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a system bus 706. The processing unit 702 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 702.

The system bus 706 provides an interface for system components including, but not limited to, the system memory 704 to the processing unit 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components of the communication system 500.

A user can enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the system bus 706, but can be connected by other interfaces such as a parallel port, IEEE 694 serial port, a game port, a USB port, an IR interface, and so forth.

A monitor 742 or other type of display device is also connected to the system bus 706 via an interface, such as a video adaptor 744. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many or all of the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the system bus 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
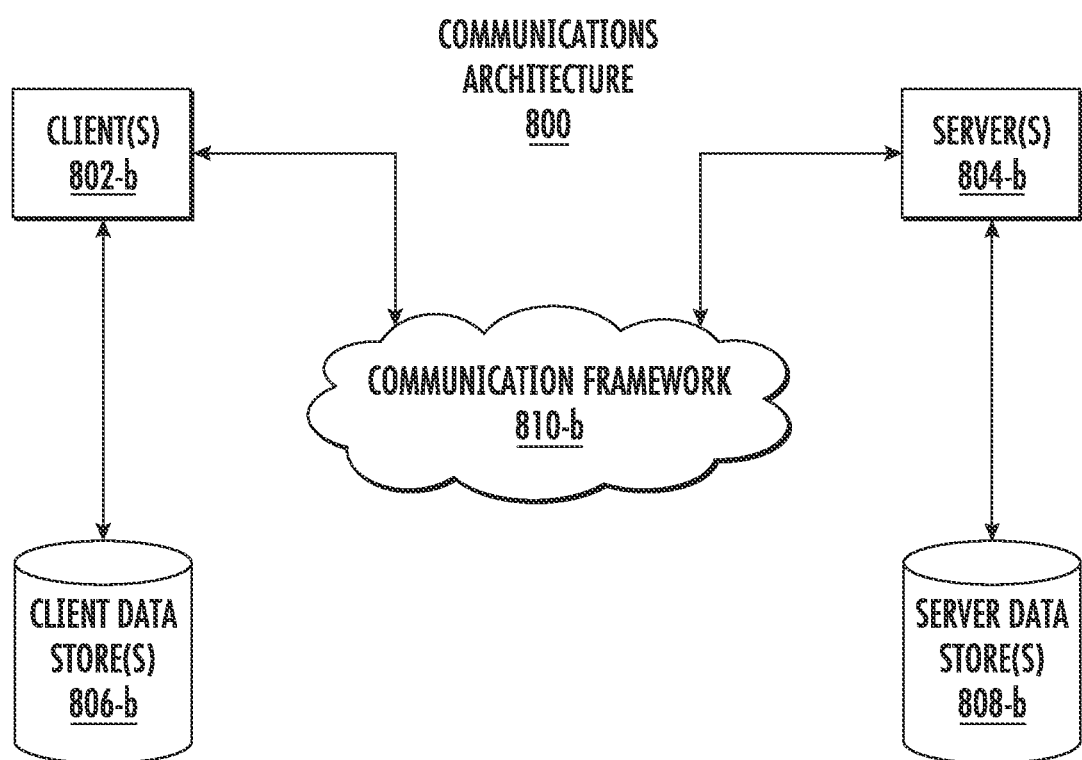
FIG. 8 depicts an exemplary communication architecture.

FIG. 8 is a block diagram depicting an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The clients 802 may implement the client device 510. The servers 804 may implement the server device 526. The clients 802 and the servers 804 are operatively connected to one or more respective client data stores 806 and server data stores 808 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

IV. General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

V. Conclusion

Any or all of the above-described techniques may be implemented by suitable logic stored on a non-transitory computer-readable medium. When executed by one or more processors, the logic may cause the processors to perform the techniques identified above. The logic may be implemented fully or partially in hardware. The logic may be included as part of a controller for controlling the actuation, de-actuation, movement, position, etc. of a soft robotic actuator and/or a soft robotic system employing one or more actuators in a gripper arrangement.

What is claimed is:

1. A system comprising:
   a local processor operative to communicate with a remote electronic processor device; and
   a pick and place station in communication with the local processor and comprising:
   a robotic system comprising a base,
   a robotic arm coupled to the base at a first end, and
   a calibration tool, the calibration tool having a proximal end coupled to the robotic arm at a second end of the robotic arm and a distal end opposite the proximal end; and
   a sensor,
   wherein the local processor is configured to:
   receive a calibration command, and
   perform a calibration check by deploying the distal end of the calibration tool at a location in a z-plane substantially corresponding to a location at a base of a picking area in which the robotic system operates.

2. The system of claim 1, wherein performing the calibration check comprises detecting a presence of a calibration sheet with a predetermined pattern of targets for the calibration tool, and causing the distal end of the calibration tool to touch the predetermined pattern of targets.

3. The system of claim 2, wherein the local processor is configured to cause the distal end of the calibration tool to touch the predetermined pattern of targets in a predetermined order.

4. The system of claim 1, wherein the sensor comprises a camera or a visualization system, and the calibration command is further configured to cause the local processor to recalibrate or canonicalize the sensor.

5. The system of claim 4, wherein the local processor is configured to canonicalize the sensor by skewing or reorienting some or all of an image from the sensor.

6. The system of claim 1, wherein the calibration check comprises:
   checking a range sensor of the robotic system against a target of known distance;
   detecting an anomaly with the range sensor; and
   flagging the range sensor to be cleaned.

7. The system of claim 6, wherein the local processor is further configured to move the robotic arm to a gripper cleaning position at a station within a work envelope of the robotic system, the station providing an external gripper cleaning function.

8. The system of claim 1, further comprising a plurality of pick and place stations in communication with the local processor.

9. The system of claim 1, wherein the local processor receives commands from the remote electronic processor device and communicates control instructions to the robotic system.

10. The system of claim 1, wherein the local processor receives information from the robotic system and communicates the received information to the remote electronic processor device.

11. The system of claim 1, further comprising a cloud backend to receive and store information communicated from one or more of the local processor, the remote electronic processor device, or the robotic system.

12. The system of claim 11, wherein the cloud backend receives information comprising one or more of: sensor data, a failure rate of a component of the robotic system, a maintenance schedule, an identified problem, or a software crash.

13. The system of claim 11, the cloud backend operative to do one or more of: recommending changes to a maintenance or replacement schedule or suggesting a repair.

14. The system of claim 11, the cloud backend operative to transmit a software update to one or more of the local processor or the remote electronic processor device.

15. A method comprising:
  receiving, at a local processor of a pick and place station, a calibration command, the pick and place station comprising:
    a robotic system comprising a base,
    a robotic arm coupled to the base at a first end,
    a calibration tool, the calibration tool having a proximal end coupled to the robotic arm at a second end of the robotic arm and a distal end opposite the proximal end, and a sensor;
  performing, using the robotic system, a calibration check by deploying the distal end of the calibration tool at a location in a z-plane substantially corresponding to a location at a base of a picking area in which the robotic system operates.

16. The method of claim 15, wherein performing the calibration check comprises detecting a presence of a calibration sheet with a predetermined pattern of targets for the calibration tool, and causing the distal end of the calibration tool to touch the predetermined pattern of targets.

17. The method of claim 15, wherein the sensor comprises a camera or a visualization system, and further comprising recalibrating or canonicalizing the sensor.

18. The method of claim 15, wherein performing the calibration check comprises:
  checking a range sensor of the robotic system against a target of known distance;
  detecting an anomaly with the range sensor; and
  flagging the range sensor to be cleaned.

19. The method of claim 18, further comprising moving the robotic arm to a gripper cleaning position at a station within a work envelope of the robotic system, the station providing an external gripper cleaning function.

20. The method of claim 15, further comprising receiving, at the local processor from a cloud backend, one or more of: a recommended change to a maintenance or replacement schedule, a suggested repair, or a software update.

* * * * *